US012422267B2

(12) United States Patent
Wu

(10) Patent No.: US 12,422,267 B2
(45) Date of Patent: Sep. 23, 2025

(54) NAVIGATION METHOD AND APPARATUS

(71) Applicant: SHENZHEN YINWANG INTELLIGENT TECHNOLOGIES CO., LTD., Shenzhen (CN)

(72) Inventor: Yong Wu, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 17/896,163

(22) Filed: Aug. 26, 2022

(65) Prior Publication Data
US 2022/0412764 A1 Dec. 29, 2022

Related U.S. Application Data

(63) Continuation of application No. PCT/CN2020/077305, filed on Feb. 28, 2020.

(51) Int. Cl.
G01C 21/36 (2006.01)
G01C 21/00 (2006.01)
G01C 21/34 (2006.01)

(52) U.S. Cl.
CPC ....... *G01C 21/3658* (2013.01); *G01C 21/343* (2013.01); *G01C 21/3889* (2020.08)

(58) Field of Classification Search
CPC .............. G01C 21/3658; G01C 21/343; G01C 21/3889
See application file for complete search history.

(56) References Cited

U.S. PATENT DOCUMENTS

2006/0031008 A1* 2/2006 Kimura .............. G01C 21/3655
701/437
2010/0169009 A1* 7/2010 Breed ............. B60W 30/18159
340/436

(Continued)

FOREIGN PATENT DOCUMENTS

CN 102636177 A 8/2012
CN 102735256 A 10/2012

(Continued)

OTHER PUBLICATIONS

International Search Report and Written Opinion issued in PCT/CN2020/077305, dated Dec. 1, 2020, 12 pages.

(Continued)

*Primary Examiner* — Frederick M Brushaber
(74) *Attorney, Agent, or Firm* — Slater Matsil, LLP

(57) ABSTRACT

A navigation method and apparatus providing a navigation path for a target vehicle are disclosed. The method includes: receiving first location information of the target vehicle sent by a high-definition map module, where the first location information includes lane information of a first location at which the target vehicle is currently located; and determining a navigation path based on the first location information and a destination of the target vehicle. The lane information of the current location of the target vehicle can be provided for a navigation map module by using the high-definition map module, so as to more accurately determine a navigation path suitable for a lane in which the target vehicle is currently located, thereby improving accuracy of navigation planning.

17 Claims, 17 Drawing Sheets

(56) References Cited

U.S. PATENT DOCUMENTS

| | | | |
|---|---|---|---|
| 2011/0320121 A1* | 12/2011 | Kang | G01S 19/41 |
| | | | 701/412 |
| 2013/0204520 A1* | 8/2013 | Nomura | G01C 21/3658 |
| | | | 701/411 |
| 2015/0185026 A1* | 7/2015 | Hightower | G01C 21/3658 |
| | | | 701/533 |
| 2016/0305787 A1 | 10/2016 | Sato et al. | |
| 2017/0192436 A1* | 7/2017 | Min | G05D 1/028 |
| 2017/0284814 A1* | 10/2017 | Gaither | G01C 21/3658 |
| 2017/0323566 A1* | 11/2017 | Suto | G08G 1/096861 |
| 2019/0324475 A1* | 10/2019 | Dean | G05D 1/0278 |
| 2020/0004268 A1* | 1/2020 | Park | G01C 21/3658 |

FOREIGN PATENT DOCUMENTS

| | | | |
|---|---|---|---|
| CN | 104567897 A | 4/2015 | |
| CN | 104880193 A | 9/2015 | |
| CN | 106323305 A | 1/2017 | |
| CN | 107289956 A | 10/2017 | |
| EP | 2972096 A1 | 1/2016 | |
| EP | 3287744 A1 | 2/2018 | |
| EP | 3605025 A1 | 2/2020 | |
| WO | WO-2020006091 A1 * | 1/2020 | G01C 21/28 |

OTHER PUBLICATIONS

Extended European Search Report issued in EP20921343.8, dated Mar. 6, 2023, 8 pages.

Office Action issued in CN202080002473.9, dated Oct. 21, 2023, 7 pages.

Communication pursuant to Article 94(3) issued in EP20921343.8, dated Jan. 29, 2024, 5 pages.

* cited by examiner

NAVIGATION METHOD AND APPARATUS

CROSS-REFERENCE TO RELATED APPLICATIONS

This application is a continuation of International Application No. PCT/CN2020/077305, filed on Feb. 28, 2020. The disclosures of the aforementioned applications are hereby incorporated by reference in their entireties.

TECHNICAL FIELD

This application relates to the field of driving technologies, and in particular, to a navigation method and apparatus.

BACKGROUND

As there are increasing vehicles in cities, traffic becomes increasingly congested. To accommodate increasing traffic flow, designs of urban roads become increasingly complex. In the prior art, a navigation map provides a road navigation function for vehicles, and usually provides path planning information for vehicle traveling by using global navigation satellite system (GNSS)/global positioning system (GPS) positioning information. However, because GNSS/GPS positioning precision of the navigation map is relatively low, when a road condition is complex, a lane (such as a main road or a side road) in which a vehicle is located cannot be identified on the navigation map, or a vehicle may have deviated from a navigation path but this case is not discovered in a timely manner. As a result, an error occurs in navigation path planning

SUMMARY

Embodiments of this application provide a navigation method and apparatus, to improve accuracy of navigation planning.

According to a first aspect, an embodiment of this application provides a navigation method. The method is used to provide a navigation path for a target vehicle. The method may be implemented by a navigation map module, or may be implemented by a navigation apparatus including a navigation map module. The method includes: receiving first location information of the target vehicle sent by a high-definition map module, where the first location information includes lane information of a first location at which the target vehicle is currently located; and determining a navigation path based on the first location information and a destination.

Based on the foregoing solution, the lane information of the current location of the target vehicle can be provided for the navigation map module by using the high-definition map module, so as to more accurately determine a start point of a navigation path suitable for a lane in which the target vehicle is currently located. For example, if it is determined that the lane in which the target vehicle is located belongs to a main road, the main road may be used as the start point of the navigation path. This prevents an error in path planning caused because whether the location of the target vehicle is on a main road or a side road cannot be distinguished in the prior art. Further, the navigation map module can determine an actual road condition of the target vehicle more accurately based on lane-level road information of the first location at which the target vehicle is currently located, to plan a more appropriate navigation path, thereby improving a navigation effect.

In a possible implementation, the first location information further includes lane-level road information in a first preset peripheral region range of the first location at which the target vehicle is currently located.

According to the foregoing method, the navigation map module can further better determine an actual road condition of a start point of the target vehicle based on the lane-level road information in the first preset peripheral region range in which the target vehicle is currently located, to plan a more appropriate navigation path, thereby improving a navigation effect.

In a possible implementation, the determining a navigation path based on the first location information and a destination includes: generating an initial navigation path based on the first location information and the destination of the target vehicle; sending the initial navigation path to the high-definition map module; receiving lane-level road information of the initial navigation path returned by the high-definition map module, where the lane-level road information of the initial navigation path includes lane-level road information of a road section of the initial navigation path; and determining the navigation path based on the lane-level road information of the initial navigation path.

Based on the foregoing solution, the initial navigation path can be generated in the navigation map module based on the start point and the destination of the target vehicle, to obtain the lane-level road information that is from the high-definition map module and that is based on the initial navigation path. Further, the navigation map module can update, based on the lane-level road information of the initial navigation path, an inappropriate navigation path planned when road information in the navigation map module is not updated in a timely manner. In this way, better navigation experience is provided for a user, and a navigation requirement of the user is satisfied.

In an example embodiment, the lane-level road information of the initial navigation path further includes lane-level road information of a road section in a second preset peripheral region range corresponding to the initial navigation path.

According to the foregoing method, the navigation map module can also update, based on the lane-level road information of the road section in the second preset peripheral region range, the inappropriate navigation path planned when the road information in the navigation map module is not updated in a timely manner, thereby optimizing the navigation path. In this way, better navigation experience is provided for the user, and the navigation requirement of the user is satisfied.

In an example embodiment, the determining the navigation path based on the lane-level road information of the initial navigation path includes: if it is determined, based on the lane-level road information of the initial navigation path, that a road or lane that is impassable or that is recommended to be bypassed exists in the initial navigation path, updating the initial navigation path based on the determined road or lane that is impassable or that is recommended to be bypassed, and the first location information and the destination of the target vehicle, and determining that the navigation path is an updated initial navigation path.

According to the foregoing method, after determining that a road or lane that is impassable or that is recommended to be bypassed exists in the initial navigation path, the navigation map module can select, from the lane-level road information of the initial navigation path, a road or lane that is passable or that is recommended for traveling, to update the initial navigation path. This avoids a case in which a road or lane that is impassable or that is recommended to be bypassed exists in the initial navigation path, thereby providing better navigation experience for the user, and satisfying the navigation requirement of the user.

In an example embodiment, the initial navigation path includes K candidate paths, and the determining the navigation path based on the lane-level road information of the initial navigation path includes: selecting the navigation path from the K candidate paths based on the lane-level road information of the initial navigation path, where the lane-level road information of the initial navigation path includes at least one of: lane information of the initial navigation path in the second preset peripheral region range, lane availability information of the initial navigation path in the second preset peripheral region range, or driving mode information supported by the initial navigation path in the second preset peripheral region range.

According to the foregoing method, the navigation map module can select, from the K candidate paths based on one or more of the lane information, the lane availability information, the supported driving mode information, or the like of the initial navigation path in the second preset peripheral region range, a road or lane by using which driving experience more satisfies a current requirement, to update the initial navigation path. In this way, better navigation experience is provided for the user, and the navigation requirement of the user is satisfied.

In an example embodiment, the method further includes: receiving second location information of the target vehicle sent by the high-definition map module, where the second location information includes lane information of a second location at which the target vehicle is currently located; receiving, by the navigation map module, yaw probability information, where the yaw probability information is used to indicate a probability that the target vehicle travels from the second location and then deviates from the navigation path; determining, based on the yaw probability information, to update the navigation path; and updating the navigation path based on the second location information and the destination.

According to the foregoing method, when the navigation map module does not determine that the target vehicle has yawed (for example, when the high-definition map module determines that the target vehicle has traveled to a lane that deviates from a navigation direction, or predicts that the target vehicle is to travel to a lane that deviates from a navigation direction, the navigation map module cannot determine whether the target vehicle has yawed), the navigation map module can receive the yaw probability information sent by the high-definition map module (the high-definition map module may determine, based on lane information of the lane in which the target vehicle is located, that the target vehicle may yaw), and further determine, based on the probability that is of deviating from the navigation path and that is provided in the yaw probability information, whether the navigation path needs to be updated; and if determining that the navigation path needs to be updated, the navigation map module can update the navigation path based on the second location information of the target vehicle. Compared with the prior art in which replanning can be performed only when a location of the target vehicle has deviated from a navigation path by a quite long distance, in this solution, that the target vehicle may yaw can be earlier discovered, to update the navigation path earlier to prevent possible yaw, thereby providing better navigation experience for the user.

In an example embodiment, the method further includes: receiving second location information of the target vehicle sent by the high-definition map module, where the second location information includes lane information of a second location at which the target vehicle is currently located; receiving yaw alarm information, where the yaw alarm information is used to indicate that the second location is not in the navigation path; and updating the navigation path based on the second location information and the destination.

According to the foregoing method, when the navigation map module does not determine that the target vehicle has yawed (for example, when the high-definition map module determines that the target vehicle has traveled to a lane that deviates from a navigation direction, the navigation map module cannot determine whether the target vehicle has yawed), the navigation map module can receive the yaw alarm information sent by the high-definition map module (the high-definition map module may determine, based on lane information of the lane in which the target vehicle is located, that the target vehicle has yawed), and further update the navigation path based on the second location information provided in the yaw probability information. Compared with the prior art in which replanning can be performed only when a location of the target vehicle has deviated from a navigation path by a quite long distance, in this solution, that the target vehicle has yawed can be earlier discovered, to update the navigation path earlier to prevent yaw, thereby providing better navigation experience for the user.

In an example embodiment, the second location information further includes lane-level road information in a first preset peripheral region range of the second location at which the target vehicle is currently located. Further, the navigation map module may update the navigation path based on the lane-level road information in the first preset peripheral region range of the second location at which the target vehicle is currently located, thereby improving navigation accuracy.

In an example embodiment, the method further includes: receiving third location information sent by the high-definition map module, where the third location information includes lane information of a third location, the third location is a location that is predicted by the high-definition map module based on the second location information and to which the target vehicle may travel after a specific time period, and the third location is not in the navigation path; and updating the navigation path based on the second location information, the third location information, and the destination.

According to the foregoing method, the navigation map module can receive the third location information that is of the target vehicle and that is predicted by the high-definition map module based on the lane information of the lane in which the target vehicle is located and the like. For example, if the current lane is an intersection and the high-definition map module predicts that the target vehicle is about to travel from a main road to a side road, the navigation map module can plan, based on second location information of the main road on which the target vehicle is currently located and third location information of the side road to which the target vehicle is about to travel from the main road, a navigation path on which the target vehicle continues to travel from the side road, thereby providing better navigation experience for the user.

In an example embodiment, the method further includes: the navigation map module receives update information of the first location information of the target vehicle sent by the high-definition map module, where the update information of the first location information includes update information of lane-level road information in a first preset peripheral region range of a current location of the target vehicle; and the navigation map module determines an updated navigation path based on the update information of the first location information and the destination.

According to the foregoing method, in a traveling process of the vehicle, the navigation map module can receive the update information of the first location information of the target vehicle as the lane in which the target vehicle is located changes, and further update the navigation path. In this way, better navigation experience is provided for the user.

In an example embodiment, the update information of the first location information is received by the navigation map module at a first moment after the navigation map module sends the initial navigation path; and the first moment is determined based on a moving speed of the target vehicle and/or is preset.

According to the foregoing method, the navigation map module can periodically receive the update information of the first location information, or can determine, based on the moving speed of the target vehicle, a time at which the update information of the first location information is received. This ensures that the navigation map module can obtain necessary lane-level road information to implement better navigation path planning According to a second aspect, an embodiment of this application provides a navigation method. The method is used to provide a navigation path for a target vehicle. The method may be implemented by a high-definition map module, or may be implemented by a navigation apparatus including a high-definition map module. The method includes: generating first location information of the target vehicle based on positioning information of the target vehicle, where the first location information includes lane information of a first location at which the target vehicle is currently located; and sending the first location information to a navigation map module, where the first location information is used by the navigation map module to determine a navigation path.

Based on the foregoing solution, lane-level road information in a first preset peripheral region range of the current location of the target vehicle and the lane information of the current location of the target vehicle are determined by using a high-definition map and based on the positioning information that is of the target vehicle and that is determined by the high-definition map module, so as to more accurately determine a lane in which the target vehicle is currently located. This can effectively avoid a problem that an error occurs in path planning because the location of the target vehicle cannot be determined, for example, whether the target vehicle is on a main road or a side road cannot be determined.

In an example embodiment, the first location information further includes lane-level road information in a first preset peripheral region range of the first location at which the target vehicle is currently located. Further, more lane-level road information of the first location of the target vehicle can be provided for the navigation map module, to improve accuracy of navigation planning.

In an example embodiment, the method further includes: receiving an initial navigation path from the navigation map module, where the initial navigation path is generated by the navigation map module based on the first location information and a destination; determining lane-level road information of the initial navigation path based on the initial navigation path, where the lane-level road information of the initial navigation path includes lane-level road information of a road section of the initial navigation path; and sending the lane-level road information of the initial navigation path to the navigation map module.

Based on the foregoing solution, the lane-level road information of the initial navigation path can be determined based on the received initial navigation path, and the lane-level road information of the initial navigation path is sent to the navigation map module. This avoids a case in which an inappropriate navigation path is planned because road information in the navigation map module is not updated in a timely manner, thereby providing better navigation experience for a user, and satisfying a navigation requirement of the user.

In an example embodiment, the lane-level road information of the initial navigation path includes at least one of: a road or lane that is impassable or that is recommended to be bypassed in the initial navigation path, lane information of the initial navigation path in a second preset peripheral region range, lane availability information of the initial navigation path in the second preset peripheral region range, or driving mode information supported by the initial navigation path in the second preset peripheral region range.

Based on the foregoing solution, the high-definition map module can provide more abundant lane-level road information for the navigation map module, to improve accuracy of planning a navigation path by the navigation map module.

In an example embodiment, the method further includes: determining second location information of the target vehicle, where the second location information includes lane information of a second location at which the target vehicle is currently located; sending the second location information to the target vehicle; determining yaw probability information of the target vehicle based on the navigation path and the second location information, where the yaw probability information is used to indicate a probability that the target vehicle travels from the second location and then deviates from the navigation path; and sending the yaw probability information to the navigation map module.

According to the foregoing method, when the navigation map module does not determine that the target vehicle has yawed (for example, when the high-definition map module determines that the target vehicle has traveled to a lane that deviates from a navigation direction, or predicts that the target vehicle is to travel to a lane that deviates from a navigation direction, the navigation map module cannot determine whether the target vehicle has yawed), the high-definition map module can determine, based on lane information of a lane in which the target vehicle is located, that the target vehicle may yaw, and further determine a probability of deviation from the navigation path and provide the probability for the navigation map module. In this way, that the target vehicle may yaw can be earlier discovered, to update the navigation path earlier to prevent possible yaw, thereby providing better navigation experience for the user.

In an example embodiment, the method further includes: determining second location information of the target vehicle, where the second location information includes lane information of a second location at which the target vehicle is currently located; sending the second location information to the target vehicle; generating yaw alarm information of the target vehicle based on the navigation path and the second location information, where the yaw alarm information is used to indicate that the second location is not in the navigation path; and sending the yaw alarm information to the navigation map module.

According to the foregoing method, when the navigation map module does not determine that the target vehicle has yawed (for example, when the high-definition map module determines that the target vehicle has traveled to a lane that deviates from a navigation direction, the navigation map module cannot determine whether the target vehicle has yawed), the high-definition map module can determine, based on lane information of a lane in which the target vehicle is located, that the target vehicle has yawed, and further send the yaw alarm information to the navigation map module, so that the navigation map module earlier discovers that the target vehicle has yawed, to update the navigation path earlier to prevent yaw, thereby providing better navigation experience for the user.

In an example embodiment, the second location information further includes lane-level road information in a first preset peripheral region range of the second location at which the target vehicle is currently located. Further, the navigation map module may update the navigation path based on the lane-level road information in the first preset peripheral region range of the second location at which the target vehicle is currently located, thereby improving navigation accuracy.

In an example embodiment, the method further includes: generating third location information based on the navigation path and the second location information, where the third location information includes lane information of a third location, the third location is a location that is predicted by the high-definition map module based on the second location information and to which the target vehicle may travel after a specific time period, and the third location is not in the navigation path; and sending the third location information to the navigation map module.

According to the foregoing method, the high-definition map module can predict the third location information of the target vehicle based on the lane information of the lane in which the target vehicle is located and the like. For example, the current lane is an intersection, and the high-definition map module predicts that the target vehicle is about to travel from a main road to a side road, so that the navigation map module can plan, based on second location information of the main road on which the target vehicle is currently located and third location information of the side road to which the target vehicle is about to travel from the main road, a navigation path on which the target vehicle continues to travel from the side road, thereby providing better navigation experience for the user.

In an example embodiment, the method further includes: the high-definition map module determines update information of the first location information of the target vehicle based on a current positioning result of the target vehicle; and the high-definition map module sends the update information of the first location information of the target vehicle to the navigation map module, where the update information of the first location information includes update information of lane-level road information in a first preset peripheral region range of the current location of the target vehicle.

According to the foregoing method, in a traveling process of the target vehicle, the high-definition map module can determine the update information of the first location information of the target vehicle as the lane in which the target vehicle is located changes, and further send the update information of the first location information to the navigation map module, so that the navigation map module updates the navigation path, thereby providing better navigation experience for the user.

In an example embodiment, the update information of the first location information is sent by the navigation map module at a first moment after the navigation map module receives the initial navigation path; and the first moment is determined based on a moving speed of the target vehicle or is preset.

According to the foregoing method, the high-definition map module can periodically determine the update information of the first location information, or can determine the update information of the first location information based on the moving speed of the target vehicle. This ensures that the navigation map module can obtain necessary lane-level road information to implement better navigation path planning For example, the first location information and the second location information include one or more of: a vehicle head direction of the target vehicle, lane information in the first preset peripheral region range of the current location of the target vehicle, or lane availability information in the first preset peripheral region range of the current location of the target vehicle.

The third location information includes one or more of: a predicted vehicle head direction of the target vehicle, lane information in a first preset peripheral region range of a predicted location of the target vehicle, or lane availability information in the first preset peripheral region range of the predicted location of the target vehicle.

For example, the lane information includes one or more of: a quantity of lanes, a number of a lane, lane direction information, lane start and end points, a lane change point, lane curvature information, lane slope information, or a lane type; and the lane type may include a main road lane, a side road lane, a merging lane, a ramp lane, a unidirectional lane, a bidirectional lane, or a tidal lane.

The lane availability information includes at least one of: information indicating whether a lane is passable, information indicating that a lane is recommended to be bypassed, road condition information, or traffic rule information.

According to a third aspect, an embodiment of this application further provides a navigation apparatus, including units configured to perform the steps in the first aspect, or units configured to perform the steps in the second aspect. Specifically, the navigation apparatus may include a transceiver unit and a processing unit. The navigation apparatus may be the navigation map module in the first aspect, or the apparatus including the foregoing navigation map module. Alternatively, the navigation apparatus may be the high-definition map module in the second aspect, or the apparatus including the foregoing high-definition map module. The navigation apparatus includes a corresponding module, unit, or means for implementing the foregoing methods. The module, unit, or means may be implemented by using hardware, implemented by using software, or implemented by hardware executing corresponding software. The hardware or software includes one or more modules or units corresponding to the foregoing functions.

According to a fourth aspect, an embodiment of this application further provides a navigation apparatus, including at least one processing element and at least one storage element. The at least one storage element is configured to store a program and data. The at least one processing element is configured to invoke and execute the program and the data stored in the at least one storage unit, to perform the first aspect or the possible implementation solutions in the first aspect of the embodiments of this application, or perform the second aspect or the possible implementation solutions in the second aspect of the embodiments of this application, or perform the first aspect or the possible implementation solutions in the first aspect and the second aspect or the possible implementation solutions in the second aspect of the embodiments of this application. The processing unit may be implemented based on a processor, and the storage unit may be implemented based on a memory.

According to a fifth aspect, an embodiment of this application further provides a computer program product. When the computer program product is run on a processor, the navigation apparatus is enabled to implement the possible methods provided in the first aspect or the second aspect.

According to a sixth aspect, an embodiment of this application further provides a computer storage medium. The computer storage medium stores a computer program. When the computer program is executed by a processor, the navigation apparatus is enabled to implement the possible methods provided in the first aspect or the second aspect.

According to a seventh aspect, an embodiment of this application further provides a chip. The chip is configured to read a computer program stored in a memory, to implement the possible methods provided in the first aspect or the second aspect. The chip may be coupled to the memory.

According to an eighth aspect, an embodiment of this application further provides a chip system. The chip system includes a processor, configured to support a computer apparatus in implementing the possible methods provided in the first aspect or the second aspect. In an example embodiment, the chip system further includes a memory, and the memory is configured to store a program and data that are necessary for the computer apparatus. The chip system may include a chip, or may include a chip and another discrete device.

According to a ninth aspect, an embodiment of this application further provides a navigation system, including a navigation apparatus corresponding to the navigation map module in the third aspect, a navigation apparatus corresponding to the high-definition map module in the fourth aspect, or the navigation apparatus in the fifth aspect.

For technical effects that can be achieved by the solutions in the third aspect to the ninth aspect, refer to the description about the technical effects of the corresponding solution in the first aspect. Details are not described herein again.

DESCRIPTION OF EMBODIMENTS

The following describes in detail the embodiments of this application with reference to the accompanying drawings.

The following further describes the present invention in detail with reference to the accompanying drawings. Apparently, the described embodiments are some but not all of the embodiments of this application. A specific operation method in a method embodiment may also be applied to an apparatus embodiment. In the description of the embodiments of this application, a person of ordinary skill in the art can understand that various numbers such as first and second in this application are merely used for differentiation for ease of description, but are not intended to limit the scope of the embodiments of this application, or are not intended to indicate a sequence. "A plurality of" means two or more. The term "and/or" describes an association relationship for describing associated objects and represents that three relationships may exist. For example, A and/or B may represent any one of the three cases: Only A exists, both A and B exist, or only B exists. The character "/" generally indicates an "or" relationship between the associated objects, "at least one" means one or more, and "at least two" means two or more. Herein, "at least one", "any one", or a similar expression thereof means any combination of these items, including a singular (item) or any combination of a plural (items).

A navigation method provided in the embodiments of this application may be applied to an intelligent transportation system. A high-definition map can be used for a vehicle in the intelligent transportation system to implement traffic services. The traffic services in the embodiments of this application may be various self-driving and assisted driving services, for example, performing path planning and providing a risk early warning for manual driving. The foregoing traffic services are merely examples. The navigation method provided in the embodiments of this application provides a technical preparation for fast launch and continuous update of a vehicle to another apparatus (vehicle to x, V2X) communication service. V2X is, for example, vehicle to vehicle (V2V) communication and vehicle to infrastructure (V2I) communication.

Figure 1A:
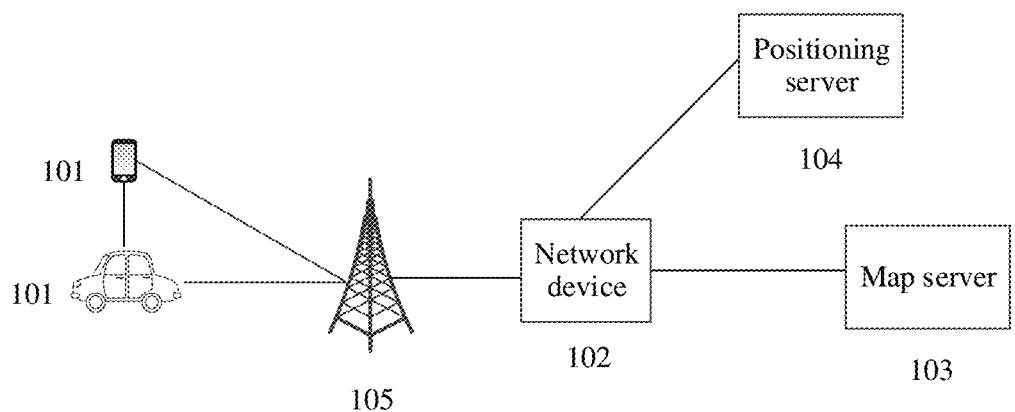
FIG. 1A is a possible schematic architectural diagram of a communications system to which an embodiment of this application is applicable.

FIG. 1A is a possible schematic architectural diagram of a communications system to which an embodiment of this application is applicable. The communications system shown in FIG. 1A includes a terminal device 101, a network device 102, a map server 103, a positioning server 104, and an access device 105. It should be understood that FIG. 1A is merely a schematic architectural diagram of the communications system. A quantity of network devices 102, a quantity of access devices 105, and a quantity of terminal devices 101 in the communications system are not limited in this embodiment of this application. In addition, the communications system to which this embodiment of this application is applicable may further include other devices such as a core network device, a wireless relay device, and a wireless backhaul device in addition to the network device 102, the access device 105, the map server 103, and the terminal device 101. In some scenarios, it may alternatively be considered that the network device 102 is a special core network device, and whether the network device 102 belongs to a core network does not affect implementation of this embodiment. This is not limited in embodiments of this application. In FIG. 1A, the terminal device 101 may be connected to the access device 105 in a wireless manner, and establish a communication link to the network device 102 by using the access device 105. There may be at least one terminal device 101. The terminal devices 101 may be connected to the access device 105 in a wireless manner, and a communication connection between the terminal devices 101 is established by using the access device 105. Alternatively, a communication connection between the terminal devices 101 may be established in a wired manner. This is not limited herein. In this embodiment, a quantity relationship between various devices is not limited. For example, a plurality of terminal devices may communicate with one access device, or a plurality of access devices may communicate with one network device. The communications system to which the foregoing system architecture is applicable includes but is not limited to: a time division duplex-long term evolution (TDD LTE) system, a frequency division duplex-long term evolution (FDD LTE) system, a long term evolution-advanced (LTE-A) system, and various other evolved wireless communications systems, for example, a 5th generation (5G) new radio (NR) communications system, or various wireless communications systems in future. In this embodiment, the access device 105 may be a device that can communicate with the terminal device. For example, the access device may be any device with wireless receiving and sending functions. The access device 105 includes but is not limited to a base station (for example, a base station, an evolved NodeB, a gNB in a 5G communications system, a base station or a network device in a future communications system, and an access node, a wireless relay node, and a wireless backhaul node in a wireless fidelity (WiFi) system. Alternatively, the access device may be a radio controller in a cloud radio access network (CRAN) scenario. Alternatively, the access device may be a small cell, a transmission node (transmission reference point, TRP), or the like. Certainly, this application is not limited thereto. In subsequent descriptions of this embodiment, any information transmission between the terminal device 101 and the network device 102 has a meaning of implementing information transmission between the terminal device 101 and the network device 102 by using the access device 105. Details are not described again in this embodiment. In this embodiment, the terminal device 101 is a device with wireless receiving and sending functions. The terminal device 101 may send a request to the network device 102, and obtain data from the network device 102. The terminal device 101 implements a navigation function by using a navigation map module. The terminal device 101 is, for example, an intelligent terminal such as an unmanned vehicle or a robot, or a vehicle-mounted terminal configured to implement an unmanned driving function, or may be a mobile phone, a tablet computer, and a vehicle-mounted navigation terminal.

In this embodiment, all functions of the network device 102 may be integrated into one independent physical device, or the functions of the network device 102 may be distributed in a plurality of independent physical devices. This is also not limited in embodiments of this application. The network device 102 is a device with wireless receiving and sending functions, and can implement a specific service function based on service information of a terminal device obtained by another device in a core network. For example, in 5G NR, the network device may be a mobile edge computing (MEC) network element. In the MEC network element, an application, content, and some service processing and resource scheduling functions of a mobile broadband (MBB) core network may be deployed together at a network edge close to an access side (access device), and provide reliable and extreme service experience through service processing close to a user and collaboration between the application, the content, and the network. It can be understood that a network element with a function similar to that of the MEC network element may be disposed in a 4th generation (4G) wireless communications network and a 3rd generation (3G) wireless communications network or another network. Therefore, specific implementation of the network device is not specifically limited in embodiments of this application. In this embodiment, when the network device 102 is an MEC network element, an application program may be loaded to the MEC network element, so that the MEC network element performs a step performed by the network device 102 in a data transmission method provided in this embodiment, to provide a service for a user terminal at a core-network edge close to an access side, thereby reducing an interaction delay.

In this embodiment, the map server 103 is a server in the Internet, and may be a single server with relatively large storage space, or may be a server cluster including a plurality of servers, or may be a cloud server with ultra-large storage space. The map server 103 is usually deployed at one or more fixed locations. As shown in FIG. 1A, there is a dashed line connection between the map server 103 and the network device 102, indicating that the map server 103 and the network device 102 may exchange data through a core network.

Figure 1B:
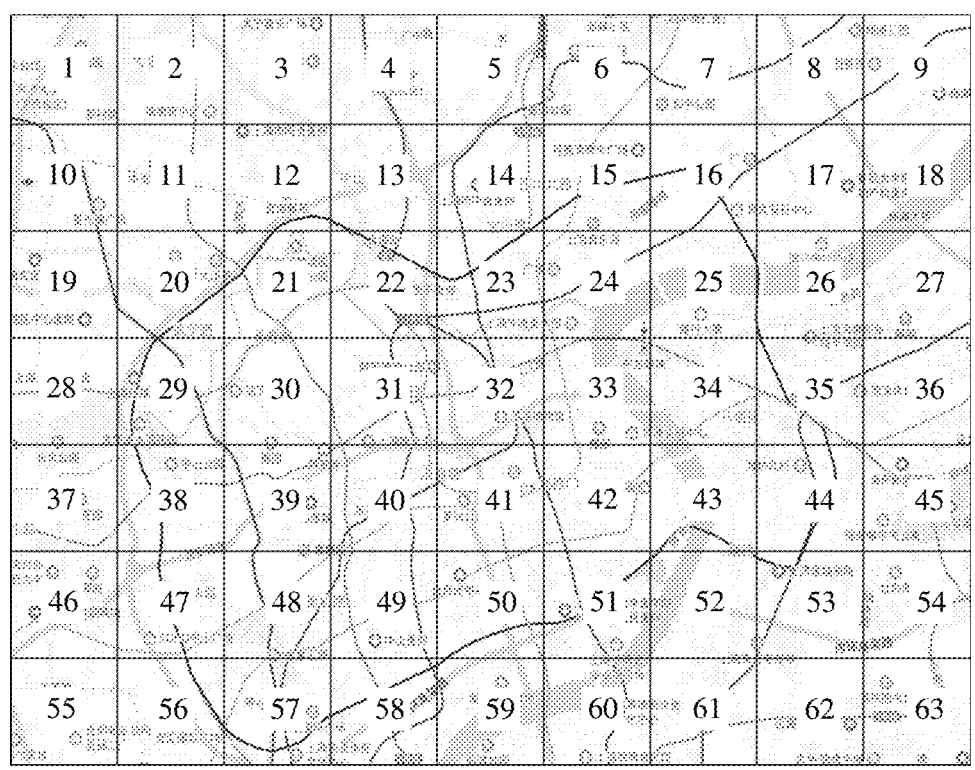
FIG. 1B is a schematic diagram of regions on a high-definition map according to an embodiment of this application.

In a possible implementation, the map server 103 may store map data of a high-definition map. Because storage space of the map server 103 is large enough, the map server 103 may store map data of the high-definition map in a relatively large coverage range. In this embodiment, the high-definition map in the map server 103 may include a plurality of regions, and each region is corresponding to an identifier. In a possible implementation, the high-definition map may be divided into a plurality of regions based on division of administrative regions (for example, districts or counties). In this case, a name of each district or county may be used as an identifier of a region. In another possible implementation, the high-definition map may be divided into a plurality of regular regions by using a preset region area as a unit. For example, the high-definition map may be divided into a plurality of regular regions through rasterization by using 1000 square meters as a unit, and a corresponding identifier is set for each region. It can be understood that a region obtained through division may alternatively be in another shape. This is not limited in embodiments of this application. It should be understood that map data corresponding to any region in this application includes some map data that is in the map data of the high-definition map and that is corresponding to the region. For example, map data of a high-definition map shown in FIG. 1B includes map data corresponding to 63 regions. For example, map data corresponding to a region 33 includes some map data that is in the map data of the high-definition map and that is corresponding to the region 33. In addition, data corresponding to an identifier of any region is equivalent to data corresponding to the region, and vice versa. Details are not described in this embodiment.

Figure 2:
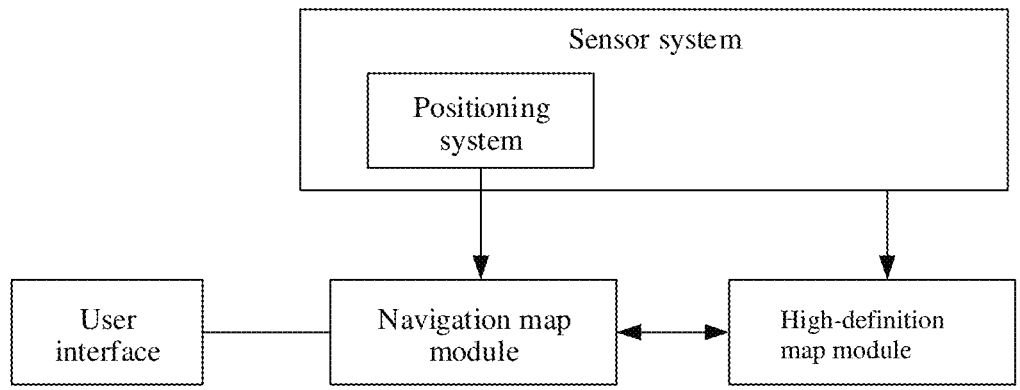
FIG. 2 is a possible schematic structural diagram of a navigation system to which an embodiment of this application is applicable.

As shown in FIG. 2, a navigation system includes a user interface, a high-definition map module, a navigation map module, a positioning system, and a sensor system. In a possible manner, all composition structures of the navigation system shown in FIG. 2 are located in one terminal device, and the terminal device includes but is not limited to a vehicle, a mobile phone, a portable navigator, or a vehicle-mounted device. In another possible implementation, the navigation system shown in FIG. 2 includes both a non-vehicle-mounted device such as a mobile phone and a vehicle-mounted device. In this case, the high-definition map module and the navigation map module may be disposed in different devices. For example, the high-definition map module may be disposed in a non-vehicle-mounted device such as a mobile phone, and the navigation map module may be disposed in a vehicle-mounted device. Alternatively, the high-definition map module may be disposed in a vehicle-mounted device, and the navigation map module may be disposed in a non-vehicle-mounted device. In still another possible implementation, the high-definition map module is disposed in a network side device, for example, a server or a roadside device, and the navigation map module is disposed in a vehicle-mounted device, a mobile phone, or another terminal device. A communication link may be established between the high-definition map module and the navigation map module to implement data transmission between the high-definition map module and the navigation map module.

Details about specific functions implemented by the modules are as follows:

The user interface can implement information exchange between the navigation system and a user. For example, when the user needs to travel, the navigation system pops up an instruction on the user interface to indicate the user to enter a traveling destination on the user interface. For another example, after the user sets a traveling destination and a traveling planning module in the navigation system determines an optimal traveling path, the traveling path finally determined by the navigation system may be displayed on the user interface. For another example, the navigation system may update, on the user interface in real time in a traveling process of a vehicle, a current location of the vehicle and a road condition in a traveling path, for example, a congestion status, whether a road is impassable, or a road emergency repair status.

The positioning system may be a GPS system, or may be a BeiDou system or another positioning system, and may be configured to estimate a geographical location of a terminal device, or may be configured to receive location information of the terminal device sent by the positioning server 104. For example, if the terminal device 101 is a vehicle-mounted device, a positioning module may be disposed in a vehicle, or the positioning module is a vehicle-mounted device. When the positioning module is disposed in a vehicle, specifically, the positioning terminal may be disposed on a roof of the vehicle, or may be disposed at another location that needs to be determined. If the terminal device 101 is a non-vehicle-mounted device such as a mobile phone, the positioning module may be disposed in the non-vehicle-mounted device such as a mobile phone. The positioning module in the terminal device 101 may send a positioning request to the positioning server, and receive location information of the positioning module returned by the positioning server.

Location information of a terminal device obtained by the navigation map module may be determined by the terminal device based on the positioning system. The positioning system may determine a location of the terminal device by using a GNSS positioning method. The positioning system may further include a positioning network element in a core network. In a 5G communications system, the positioning network element may be a service capability exposure function (SCEF) network element in the core network and/or a positioning server. In a possible implementation, the SCEF network element may obtain location information of the terminal device 101 from the positioning server. The positioning server may position the terminal device by using one or more of: a positioning method based on a cell identity (Cell ID), a positioning method based on a time difference of arrival (TDOA), a positioning method based on an angle of arrival (AOA), or the like, to obtain the location information of the terminal device. Specifically, the positioning server may be an enhanced serving mobile location center (E-SMLC) network element, and/or a gateway mobile location center, or one or more network elements with a function similar to that of the foregoing network elements. This is not limited in embodiments of this application. It should be understood that in this embodiment, the positioning server 104 and the network device 102 may belong to one physical device, or may belong to different physical devices.

The navigation map module stores navigation map data. Compared with a high-definition map, a navigation map provides only road-level navigation information. A navigation application or a map application may be installed in the terminal device 101, and the terminal device 101 may communicate with the back-end map server 103 through the Internet by using the navigation application or the map application. The terminal device 101 may generate a navigation trail based on a navigation map, to implement a navigation function. The navigation map may provide navigation information for a user to satisfy a requirement of driving route navigation. For example, the navigation map may provide navigation information such as a quantity of lanes of a current road, speed-limiting information, turning information, and route planning.

The sensor system may include several sensors that sense information about an ambient environment of a vehicle. For example, the sensor system may include a positioning system, an inertial measurement unit (IMU), a radar, a laser rangefinder, and a camera. The IMU is configured to sense a location and a direction change of the vehicle based on an inertial acceleration. In an embodiment, the IMU may be a combination of an accelerometer and a gyroscope. The radar can sense an object in the ambient environment of the vehicle by using a radio signal. In some embodiments, in addition to sensing an object, the radar can also be configured to sense a speed and/or a forward direction of the object. The laser rangefinder can use a laser to sense an object in an environment in which the vehicle is located. In some embodiments, the laser rangefinder may include one or more laser sources, a laser scanner, one or more detectors, and another system component. The camera may be configured to capture a plurality of images of the ambient environment of the vehicle. The camera may be a static camera or a video camera. Further, the vehicle may include a computer vision system that can be operated to process and analyze an image captured by the camera, to identify an object and/or a feature in the ambient environment of the vehicle. The object and/or the feature may include a traffic signal, a road boundary, and an obstacle. The computer vision system can use an object recognition algorithm, a structure from motion (SFM) algorithm, video tracking, and another computer vision technology. In some embodiments, the computer vision system may be configured to draw a map of an environment, track an object, estimate a speed of an object, and the like.

The high-definition map module is configured to store lane-level road information of a high-definition map. The high-definition map may be stored in a form of a map file (for example, a format such as Shapefile, a navigation data standard (NDS), or OpenDRIVE). The Shapefile is a spatial data open format, and is a file that describes geometric and attribute features of spatial data and that is used to store a geographic element. The Shapefile of the high-definition map mainly includes geometric information and attribute information. The geometric information is spatial coordinates of lane information, that is, a location of the lane information. The attribute information is attribute information of the lane information, for example, whether a current lane is a main road lane or a side road lane, and whether the current lane is a straight lane, a right-turn lane, a left-turn lane, or another lane. The high-definition map module may be further configured to receive map data of the high-definition map sent by the map server 103. Certainly, the high-definition map module may also periodically update high-definition map data in the high-definition map module. This is not limited herein. The high-definition map data in the high-definition map module may be a high-definition map prestored in a terminal device, or may be a high-definition map sent by the map server 103 to the terminal device. The high-definition map may alternatively be updated by a vehicle or the map server 103. For example, if the high-definition map is updated by the map server 103, the vehicle may send lane information collected by the vehicle to the map server 103; and the map server 103 determines the latest lane information. The map server 103 may proactively send an updated high-definition map to the terminal device, or may return, based on a query request sent by the terminal device, updated lane information corresponding to the high-definition map. In a specific implementation process, map data of a high-definition map of a corresponding region may be sent in a navigation process to reduce high-definition map data that needs to be stored by the terminal device 101. Alternatively, the map server 103 may deliver map data of high-definition maps of a plurality of regions in advance, and update the high-definition map data in the high-definition map module depending on a requirement for updating high-definition map data.

The high-definition map module may determine, by using the geographical location of the terminal device determined by the positioning system, an estimated location of the terminal device on the high-definition map, where positioning precision of the estimated location is lane-level positioning precision. The vehicle may perform feature matching based on the high-definition map data and information that is about an ambient environment of the vehicle and that is determined by the sensor system and the computer vision system, to determine a positioning result of the vehicle on the high-definition map. Precision of the positioning result can reach lane-level positioning precision.

In this embodiment, the high-definition map module is added to the navigation system, and the navigation map module is improved, so that after receiving a traveling destination entered by a user on the user interface, an improved navigation map module can determine, based on a destination entered by the user and by obtaining road-level data of a navigation map and lane information of a vehicle in the high-definition map module, at least one traveling path through which the user can reach the destination; and display the at least one traveling path on the user interface after determining the at least one traveling path, so that the user selects an actual traveling path, thereby achieving a purpose of planning a higher-precision and more accurate traveling path for the user based on lane-level positioning information of the vehicle, and satisfying an increasing use requirement of the user.

Further, in a self-driving system, the vehicle may further include a traveling planning module, a trail tracker, an executor, and the like. The traveling planning module is configured to: determine, from at least one traveling path determined by a navigation map module in the self-driving system and based on a traveling requirement set by a user, a traveling path that most satisfies a user requirement and corresponding traveling configuration information, and send a determined traveling planning result to the trail tracker and the executor. The trail tracker and the executor complete an entire self-driving process. The trail tracker is configured to generate, based on the traveling path and the traveling configuration information of the corresponding traveling path that are sent by the traveling planning module, a torque command acting for driving the self-driving system and a braking command of a braking system, deliver the torque command and the braking command to the corresponding executor for execution, and collect feedback information in a process of executing the commands by the corresponding executor. The executor includes a driving system and the braking system, and is configured to control vehicle traveling according to the torque command and the braking command delivered by the trail tracker. After determining the at least one traveling path, the navigation map module may submit the traveling path to the traveling planning module of the self-driving system, so that the traveling planning module can select, from the traveling path based on the user requirement, a traveling path that most satisfies the user requirement.

Based on a structural diagram of the navigation system shown in FIG. 2, the following describes the navigation method provided in the embodiments of this application.

The navigation method provided in the embodiments may include: A user may enter a to-be-reached destination on the user interface in FIG. 2; and the navigation map module queries road topology data of a navigation map based on a current location of the user and a location of the to-be-reached destination entered by the user, and determines, based on current lane information provided by the high-definition map module, at least one traveling path through which the user can reach the destination from the current location (referred to as a departure place for short below) of the user. To be specific, the at least one traveling path mentioned in this application may be provided by the navigation map module based on the lane information in the high-definition map module, map road topology data in the navigation map module, and the departure place and the destination of the user. The traveling planning module or a processing chip in the traveling planning module may present a lane-level traveling mode icon, a road-level traveling mode icon, or the like on the user interface.

Based on the navigation system shown in FIG. 2, implementation of the navigation method provided in the embodiments may include the following process. For details, refer to FIG. 3.

Step 301. The high-definition map module determines first location information of a target vehicle based on positioning information of the target vehicle.

The positioning information of the target vehicle may be positioning information that is of the target vehicle on a high-definition map and that is determined by the high-definition map module based on location information of the positioning system received by a positioning module and environment information of the vehicle obtained by the sensor system. The positioning information may include one or more of: a lane in which the vehicle is located, attribute information of the lane in which the vehicle is located, or a traveling posture of the vehicle.

The first location information determined by the high-definition map module may include lane information of a first location at which the target vehicle is currently located.

Further, the first location information may include lane-level road information in a first preset peripheral region range of the current location of the target vehicle. The first preset peripheral region range may be corresponding to a region on the high-definition map. For example, if it is determined that the target vehicle is located in a region 1, lane-level road information in the region 1 may be used as the lane-level road information in the first preset peripheral region range. Certainly, a region in which the target vehicle is located and its adjacent region may alternatively be used as the first preset peripheral region range. For another example, the region in which the target vehicle is located and at least one region in front of the region in which the target vehicle is located may alternatively be used as the first preset peripheral region range. Further, the first preset peripheral region range may be determined based on a vehicle speed of the vehicle and complexity of an environment in which the vehicle is located. For example, to improve navigation precision, if it is determined that road condition information of the vehicle is complex, the first preset peripheral region range may be expanded; or if it is determined that the road condition information of the vehicle is simple, the first preset peripheral region range may be narrowed.

The lane-level road information may include lane information required for navigation positioning. For example, lane information in a navigation positioning scenario such as at an intersection, in a ramp, or on a main road or a side road of an overpass may include but is not limited to any one or more of: lane start and end points, a lane change point, start and end points of a dedicated lane for right turn, lane attribute information, or lane availability information. The lane start and end points include a start point of a lane and an end point of the lane. The lane start and end points include start points and end points of several lane lines on a road. The start point of the lane is a point on a start line of the lane, and the end point of the lane is a point on a stop line of the lane. Generally, in actual application, the start line of the lane and a stop line of a reverse lane are on a straight line. The lane change point may be a fork point generated when a turning lane is disposed at an intersection close to some roads, or may be a merging point generated when a new road is entered through an intersection and lanes are decreased by one, or may be a fork point of an exit lane of an expressway/overpass, or a merging point of entry lanes of an expressway/overpass. In conclusion, the lane change point may include but is not limited to any one or more of: a fork point generated by increasing a quantity of lanes, a convergence point generated by decreasing a quantity of lanes, a fork point of an exit lane of an expressway (and/or an overpass), or a merging point of entry lanes of an expressway (and/or an overpass). The start and end points of the dedicated lane for right turn include intersection points, as a start point and an end point, between a lane line (or an extension line of the lane line) of the dedicated lane for right turn and two lane lines connected to the lane line (or the extension line of the lane line) of the dedicated lane for right turn. A location of a lane may be indicated by using coordinate values of the lane in a global positioning system (GPS) coordinate system. To be specific, lane information may include geographic coordinates of the lane. There are many methods for determining a location of a lane. For example, a location of each lane may be collected by using a manual marking method. Optionally, locations of the start and end points of the dedicated lane for right turn and the lane start and end points may be determined in this manner. In this embodiment, a method for automatically collecting a location of a lane by using binocular vision in combination with a GPS may alternatively be used. It should be noted that the methods for determining a location of a lane are merely examples, and this is not limited in this application.

Lane information may include one or more of: a lane identifier ID, an ID of a mesh that is on a navigation map and to which a lane is mapped, an ID of a road that is on the navigation map and to which the lane is mapped, a lane sequence number corresponding to the lane, or a lane type. The lane information is used to describe a relationship between a high-definition map and the navigation map. The lane information may be indicated by using Table 1.

TABLE 1

| Attribute name | Type | Meaning |
| --- | --- | --- |
| Road identifier | int | Road road ID |
| Lane identifier | int | Lane direction:<br>Bidirectional road: $[-n, \ldots, -1]$, which represents an $n^{th}$ lane in a reverse direction to a $1^{st}$ lane in the reverse direction<br>[0]: center lane line<br>$[1, \ldots, n]$: a $1^{st}$ lane in a forward direction to an $n^{th}$ lane in the forward direction<br>Unidirectional road: $[0, \ldots, n]$, which represents a $0^{th}$ lane in the forward direction to an $n^{th}$ lane in the forward direction<br>Tidal lane: $[-n, \ldots, -1]$, which represents an $n^{th}$ lane in the reverse direction to a $1^{st}$ lane in the reverse direction or $[1, \ldots, n]$, which represents a $1^{st}$ lane in the forward direction to an $n^{th}$ lane in the forward direction |
| type_1 | int | 0: Lane change point<br>1: Lane start and end points<br>2: Start and end points of a dedicated lane for right turn |
| type_2 | int | Lane change point: −1, which represents that a quantity of lanes decreases (a merging lane) |

TABLE 1-continued

| Attribute name | Type | Meaning |
|---|---|---|
| | | 1, which represents that a quantity of lanes increases (a ramp lane) |
| | | Lane start and end points: −1: Start point |
| | | 1: End point |
| | | Start and end points of a dedicated lane for right turn: −1: Start point, 1: End point |
| | | A leftmost/rightmost lane in the forward direction is a lane with a start number. |
| | type_3 | Left-turn lane, straight lane, right-turn lane, main road lane, and side road lane |
| | | Road/lane curvature and slope |
| | type_4 | Lane availability information: Traffic control information, road maintenance information, traffic rule information, road condition information, congestion status, or the like |

The road identifier (road_ID) is used to indicate an ID of a road that is on the navigation map and to which the lane information is mapped, is used to distinguish different roads, and is used to establish a mapping relationship between the lane information and the road on the navigation map. road_ID is derived from an attribute of a road line in a conventional navigation map. The lane identifier may be a lane sequence number or a lane line sequence number (lane_num), is used to indicate a sequence number of a lane corresponding to the lane information, and is used to distinguish different lane lines or lane directions. For example, a bidirectional road includes a forward lane, a reverse lane, a tidal lane, or the like. Sequence numbers [−n, . . . , −1] may be used to indicate an $n^{th}$ lane in a reverse direction—a $1^{st}$ lane in the reverse direction. [0] indicates a center lane line. Sequence numbers [1, . . . , n] indicate a $1^{st}$ lane in a forward direction—an $n^{th}$ lane in the forward direction. For a unidirectional road, sequence numbers [0, . . . , n] may be used to indicate a $0^{th}$ lane in the forward direction—an $n^{th}$ lane in the forward direction.

Further, the lane information may be divided into a plurality of lane information types based on different types. For example, the lane information may include a lane information type 1, a lane information type 2, a lane information type 3, and a lane information type 4. The lane information type 1 may include a lane change point, lane start and end points, and start and end points of a dedicated lane for right turn. Different types are indicated by different sequence numbers, index numbers, or IDs. For example, 0 may be used to indicate the lane change point, 1 may be used to indicate the lane start and end points, and 2 may be used to indicate the start and end points of the dedicated lane for right turn. The lane information type 2 is subdivision of the lane information type 1. The lane information type 1 may be further indicated by different sequence numbers, index numbers, or IDs. For example, −1 is used to indicate that a subtype of the lane change point is that a quantity of lanes decreases. 1 is used to indicate that a subtype of the lane change point is that a quantity of lanes increases. −1 is used to indicate that a subtype of the lane start and end points is a lane start point. 1 is used to indicate that a subtype of the lane start and end points is a lane end point. −1 is used to indicate that a subtype of the start and end points of the dedicated lane for right turn is a start point of the dedicated lane for right turn. 1 is used to indicate that a subtype of the start and end points of the dedicated lane for right turn is an end point of the dedicated lane for right turn.

The lane information type 3 may indicate a lane attribute feature such as a left-turn lane, a straight lane, a right-turn lane, a lane on a main road, and a lane on a side road, and may further include attribute information such as lane direction information and a road/lane curvature and slope. Certainly, the lane attribute information may further include information such as a merging lane, a ramp lane, a unidirectional lane, a bidirectional lane, and a tidal lane.

The lane information type 4 may indicate lane availability information, that is, related information indicating whether a lane is currently available, for example, information about traffic control, road maintenance, traffic rules (such as information about a dedicated bus lane, speed-limiting information, a large-vehicle lane, a small-vehicle lane, and traffic restriction information), a road condition, and a congestion status. lane_num, type, type_2, type_3, and type_4 may be obtained when the high-definition map is drawn or after the high-definition map is updated.

Step 302. The high-definition map module sends the first location information of the target vehicle to the navigation map module.

Step 303. The navigation map module receives the first location information of the target vehicle sent by the high-definition map module.

Step 304. The navigation map module determines a navigation path based on the first location information and a destination of the target vehicle.

After obtaining the first location information, the navigation map module may further estimate a vehicle head direction of the target vehicle based on the lane information corresponding to the first location at which the target vehicle is currently located. For example, if determining, based on the lane information of the location of the target vehicle, that a lane in which the target vehicle is located is a lane from south to north, the navigation map module may deduce that the vehicle head direction of the target vehicle is from south to north.

Further, the first location information may include a vehicle head direction of the target vehicle.

Considering that the target vehicle may travel in a reverse direction, the first location information may further include the vehicle head direction of the target vehicle. Further, the navigation map module may determine, based on the vehicle head direction of the target vehicle and the lane information of the location of the target vehicle, whether the target vehicle travels in the reverse direction. If determining that the target vehicle does not travel in the reverse direction, the navigation map module may determine, based on the vehicle head direction of the target vehicle, a direction in which the target vehicle needs to travel when the target vehicle is departed based on navigation, and perform path planning based on the direction as a start point of a navigation-based departure place.

For another example, the navigation map module may further determine, based on attribute information that is in the first location information and that is of a lane in the first location at which the target vehicle is currently located, for example, whether the lane is a lane on a main road or a lane on a side road, a departure place from which the target vehicle travels when the target vehicle is departed based on navigation, and perform navigation path planning based on the attribute information of the lane as a start point of a navigation-based departure place.

In another possible manner, the navigation map module may determine, based on a lane direction of the location of the target vehicle, a direction in which the target vehicle needs to travel when the target vehicle is departed based on navigation. For example, if it is determined that a lane direction of the lane in which the target vehicle is located is a left-turn lane, or that a distance from the target vehicle to a start point of the left-turn lane is less than a preset threshold, it may be determined that the direction in which the target vehicle needs to travel when the target vehicle is departed based on navigation is a left-turn direction. For another example, if it is determined that the lane direction of the lane in which the target vehicle is located is a right-turn lane, or that a distance from the target vehicle to a start point of the right-turn lane is less than a preset threshold, it may be determined that the direction in which the target vehicle needs to travel when the target vehicle is departed based on navigation is a right-turn direction.

In still another possible implementation, the navigation map module may alternatively determine, based on lane attribute information in the lane information in the first preset peripheral region range, a direction in which the target vehicle needs to travel when the target vehicle is departed based on navigation.

For example, if determining that the lane direction of the lane in which the target vehicle is located is a tidal lane, or that a distance from the target vehicle to a start point of the tidal lane is less than a preset threshold, the navigation map module may determine, based on a direction in which passing is allowed in a lane and that is currently corresponding to the tidal lane, the direction in which the target vehicle needs to travel when the target vehicle is departed based on navigation. Further, if it is determined, based on the vehicle head direction of the target vehicle, that the vehicle head direction of the target vehicle is opposite to the direction in which passing is allowed in a lane and that is currently corresponding to the tidal lane, the tidal lane is not used as a direction or lane in which the target vehicle needs to travel when the target vehicle is departed based on navigation. In this case, a direction of a lane that is the same as the vehicle head direction of the target vehicle may be used as the direction in which the target vehicle needs to travel when the target vehicle is departed based on navigation, it is prompted on the user interface or during the navigation that the current tidal lane is unavailable, and the lane whose direction is the same as the vehicle head direction of the target vehicle is provided for a user as a recommended lane.

For another example, if determining that the lane direction of the lane in which the target vehicle is located is a reversible lane, or a distance from the target vehicle to a start point of the reversible lane is less than a preset threshold, using an example in which the reversible lane is a lane that can allow going straight and turning right, the navigation map module may perform navigation path planning by using both a straight direction and a right-turn direction as directions in which the target vehicle needs to travel when the target vehicle is departed based on navigation, so as to provide more paths for selection.

For another example, the navigation map module may alternatively determine, based on lane curvature information in the lane information in the first preset peripheral region range, a lane that matches the vehicle head direction of the target vehicle. For example, if it is determined that there are four lanes (a lane 1, a lane 2, a lane 3, and a lane 4) on a road in front of the target vehicle and that the lane 1, the lane 2, and the lane 3 are straight lanes and the lane 4 is a merging lane, due to impact of the merging lane, curvatures of the lane 1, the lane 2, and the lane 3 are different, and a curvature of a lane (the lane 3) adjacent to the merging lane 4 is the largest, and curvatures of lanes (the lane 1 and the lane 2) that are relatively far away from the merging lane 4 are relatively small. In this case, it can be recommended, based on locations of the target vehicle and the four lanes and the curvatures of the four lanes, that a lane in which minimum turning be required by the target vehicle for traveling in a forward direction is selected for the target vehicle. For example, if it is determined that the target vehicle is closest to the lane 1, the lane 1 may be used as a lane recommended for traveling when the target vehicle is departed based on navigation. If it is determined that the target vehicle is relatively close to the lane 3, but considering a lane curvature, it may be recommended that the lane 2 be selected as a lane in which the target vehicle needs to travel when the target vehicle is departed based on navigation.

In another possible implementation, the navigation map module may alternatively use, based on lane availability information in the lane information in the first preset peripheral region range, for example, road condition information, a lane in which congestion is less severe or a passable lane as a lane recommended for traveling when the target vehicle is departed based on navigation.

Example 2

Further, to improve availability of a navigation path to avoid that a navigation path planned by a navigation map module is unavailable for the reason that a road condition on a navigation map is not updated in a timely manner in a traveling process of a vehicle, or the like, an embodiment further provides a navigation method, including the following steps:

Step 401. A navigation map module generates an initial navigation path based on first location information and a destination of a target vehicle.

For a specific method for generating the initial navigation path, refer to the foregoing embodiment, and details are not described herein again. Certainly, the navigation map module may further receive positioning information that is of the target vehicle and that is determined by a positioning system, where the positioning information is road-level positioning information. Further, the navigation map module may generate the initial navigation path based on the road-level-precision positioning information of the target vehicle from a positioning server and the destination.

Figure 4:
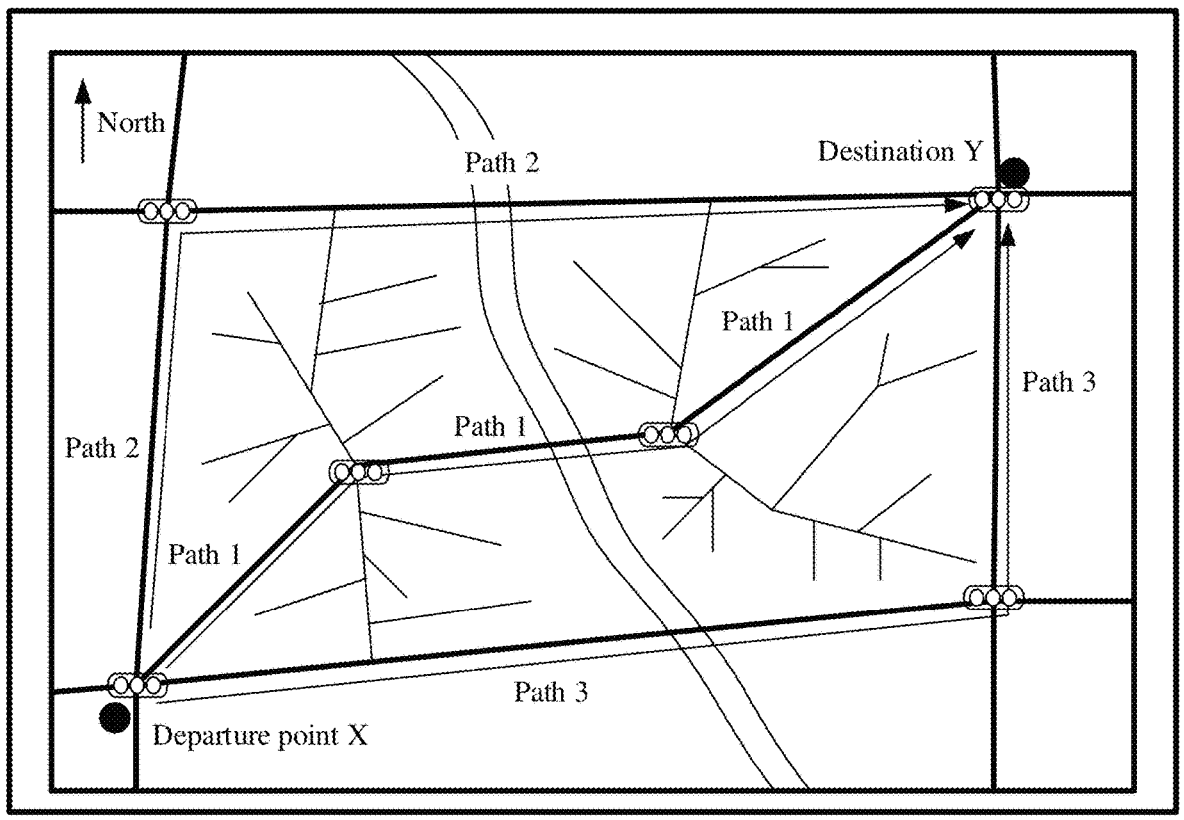
FIG. 4 is a schematic diagram of paths to which a navigation method is applicable according to an embodiment of this application.

For example, as shown in FIG. 4, a user needs to depart from a point X for a destination point Y. During specific implementation, first, a user interface displays a destination input window, and prompts the user to enter a destination of current travel. The user may be prompted, through broadcasting by a loudspeaker, or the like, to enter the travel destination. After the user successfully enters the travel destination on the user interface, the navigation map module obtains the destination entered by the user, and plans, as an initial navigation path, at least one traveling path from the current location of the user to the destination based on a current location of the user and a location of the obtained destination and with reference to road topology information, or first location information sent by the high-definition map module. For example, referring to FIG. 4, after the user enters the travel destination, the navigation map module may plan, based on the current location of the user (that is, the departure point X) and the location of the obtained destination (that is, the destination Y) and with reference to the road topology information, lane information, and lane availability information, three traveling paths through which the destination Y can be reached. It is assumed that the three paths are a path 1, a path 2, and a path 3. Herein, the path 1 is used as an example for description. Processing procedures of the path 2 and the path 3 are similar to that of the path 1, and details are not described.

Step 402. The navigation map module sends the initial navigation path to a high-definition map module.

Step 403. The high-definition map module receives the initial navigation path from the navigation map module, and further the high-definition map module determines lane-level road information of the initial navigation path based on the initial navigation path.

The lane-level road information of the initial navigation path may include lane information of the initial navigation path.

In a possible implementation, lane information of a road corresponding to the initial navigation path may be used as lane information in a second preset peripheral region range, to reduce data sending. For example, if determining, based on the lane-level road information of the initial navigation path, that an impassable road or a congested road exists in the initial navigation path, the navigation map module may send lane information of the impassable road or the congested road to the navigation map module as the lane-level road information of the initial navigation path; and then the navigation map module can bypass the impassable road or the congested road and replan a navigation path.

Further, the lane-level road information of the initial navigation path includes lane-level road information of a road section in a second preset peripheral region range corresponding to the initial navigation path.

To ensure that no impassable road or congested road exists in a replanned navigation path, in another possible implementation, the second preset peripheral region range may include a region that is on a high-definition map and in which the initial navigation path is located. Specifically, a traveling path may be divided into at least one subpath, and lane information and lane availability information of each subpath are determined. The lane information and the lane availability information may be determined based on road type—related speed-limiting information, weather type—related speed-limiting information, a congestion status, or the like that are corresponding to the subpath. A navigation planning path of the vehicle is determined based on the lane information and the lane availability information of each subpath.

Figure 5A:
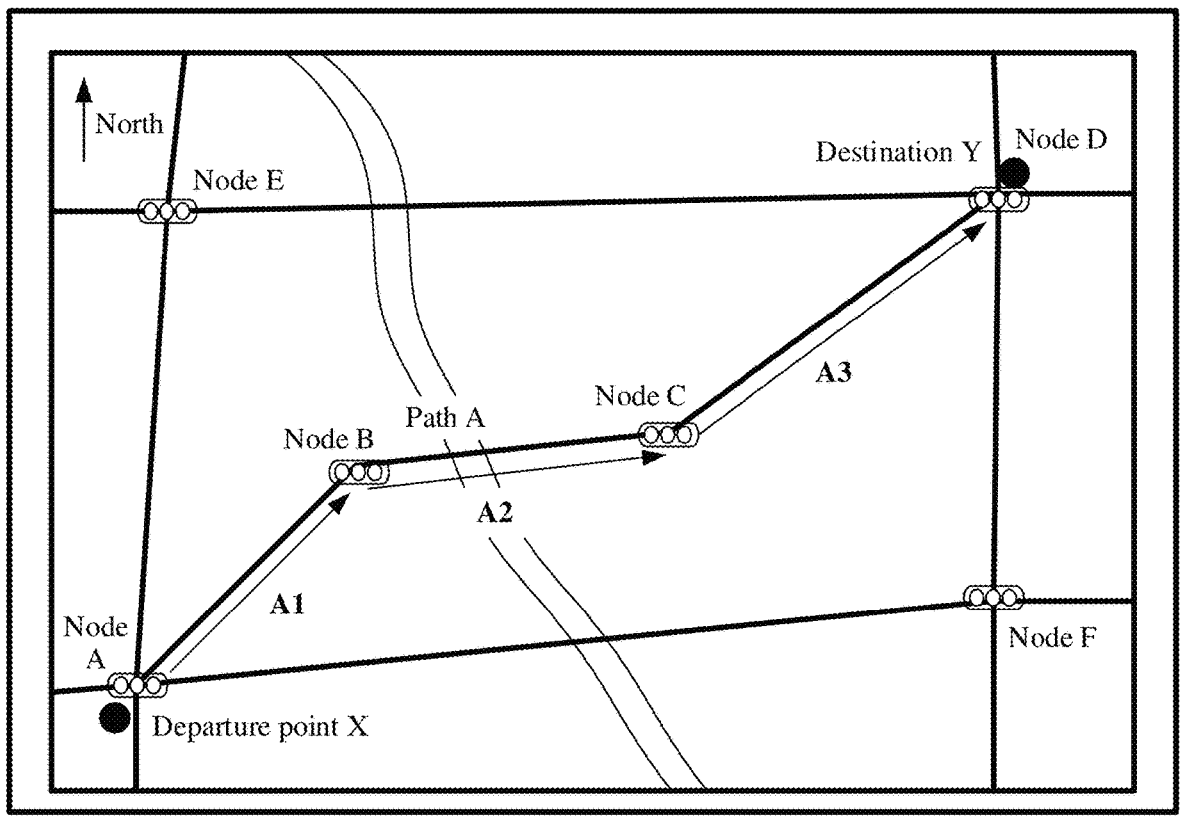
FIG. 5A to FIG. 5C are schematic diagrams of paths to which a navigation method is applicable according to an embodiment of this application.

For example, if it is determined that the initial navigation path includes N subpaths, and each subpath belongs to one region on the high-definition map, N regions on the high-definition map that are corresponding to the N subpaths may be used as the second preset peripheral region range. Further, the navigation map module may use an available lane or a road near the initial navigation path as a replanned path based on lane information in the second preset peripheral region range. For example, the high-definition map module divides a path 1 into N subpaths, for example, divides the path 1 into three subpaths in total: a section AB, a section BC, and a section CD. Specifically, as shown in FIG. 5A, when querying road topology information based on a destination entered by a user, the navigation map module may divide the path 1 into sections by using traffic lights as nodes, to obtain a plurality of subpaths. Referring to FIG. 5A, there are two traffic lights in the path 1. Therefore, the path 1 may be divided into three sections by using the two traffic lights as division points. The three sections are a section AB (which may be referred to as a subpath A1), a section BC (which may be referred to as a subpath A2), and a section CD (which may be referred to as a subpath A3).

Figure 5B:
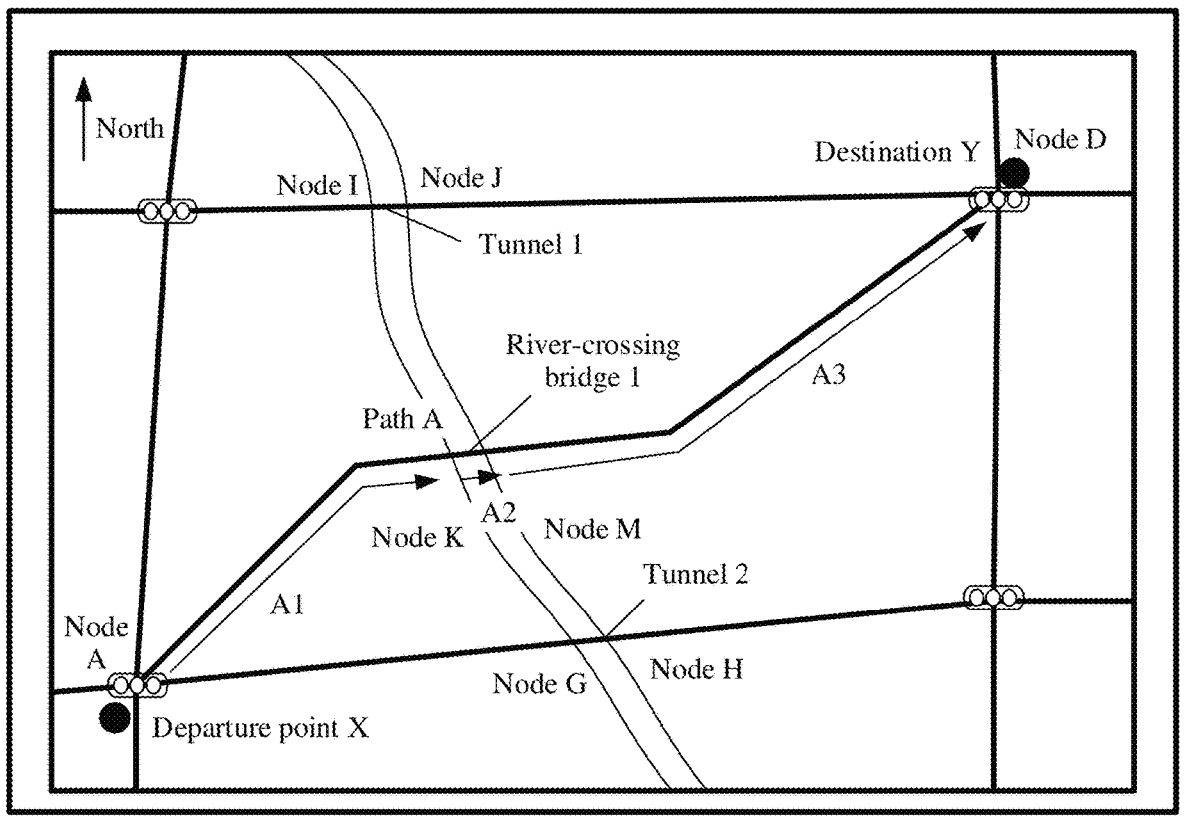

In an alternative solution, as shown in FIG. 5B, the initial navigation path may alternatively be divided into sections based on other information of a road, for example, based on attribute information such as whether the road is an overpass, a tunnel, or a bridge. A path 1 is used as an example. If it is determined that the path 1 includes a river-crossing bridge 1, the path 1 may be divided into three sections by using a start point (a node K) and an end point (a node M) of the river-crossing bridge 1 as division points. A path 2 is used as an example. If it is determined that the path 2 includes a tunnel 1, the path 2 may be divided into three sections by using a start point (a node I) and an end point (a node J) of the tunnel 1 as division points. A path 3 is used as an example. If it is determined that the path 3 includes a tunnel 2, the path 3 may be divided into three sections by using a start point (a node G) and an end point (a node H) of the tunnel 2 as division points.

In this case, if it is determined, based on map data of the high-definition map, that the current river-crossing bridge 1 is impassable or is recommended to be bypassed, information about another passable river-crossing road near the river-crossing bridge 1 may be used as lane information in a second preset peripheral region range, so that the navigation map module may replan, based on the information about the another river-crossing road, a subpath section that is in the initial navigation path and that is corresponding to the river-crossing bridge 1. Certainly, alternatively, a river-crossing road may be selected as a replanned path in another manner, and this is not limited herein.

For another example, based on availability information that is on the high-definition map and that is corresponding to the tunnel 1, for example, a weather condition, a traffic congestion status, and a road type, it may be determined that the tunnel 1 is currently a road that is impassable or is recommended to be bypassed. Assuming that the availability information of the tunnel 1 includes information that the tunnel 1 is impassable, such as there is a rainstorm warning and water is beyond a warning line, it may be determined that the tunnel 1 is currently an impassable road, and the high-definition map module may perform screening on another tunnel or a river-crossing bridge near the tunnel 1 to determine whether the another tunnel or the river-crossing bridge near the tunnel 1 is passable. If it is determined that the another tunnel or the river-crossing bridge near the tunnel 1 is also impassable, the lane-level road information of the initial navigation path that may be returned to the navigation map module may include: the tunnel 1 is impassable and the tunnel or the river-crossing bridge near the tunnel 1 is impassable. Further, the navigation map module may replan, based on the information, a subpath section that is in the initial navigation path and that is corresponding to the tunnel 1, to bypass the impassable tunnel 1 and the another impassable tunnel or the impassable river-crossing bridge near the tunnel 1.

For another example, based on availability information that is on the high-definition map and that is corresponding to the subpath 1, for example, a traffic congestion status and a road type, it may be determined that a lane that is in the subpath 1 and in which the target vehicle is located or a lane that the target vehicle is predicted to reach is a lane that is impassable or is recommended to be bypassed. Assuming that the availability information of the subpath 1 includes: a lane 1 is severely congested, a lane 2 is relatively congested, and a lane 3 is not congested, it may be determined that the lane 1 is currently a lane recommended to be bypassed. The high-definition map module may perform screening on other lanes near the tunnel 1 to determine congestion statuses of the other lanes near the lane 1. If it is determined that the congestion statuses of the other lanes near the lane 1 are that the lane 2 is relatively congested and the lane 3 is not congested, the lane-level road information of the initial navigation path that may be returned to the navigation map module may include: the lane 1 is severely congested, the lane 2 is relatively congested, and the lane 3 is not congested. Further, the navigation map module may recommend, based on the information, that a user change a lane, for example, may recommend that the user change the lane to the lane 2 or the lane 3.

Step 404. The navigation map module receives the lane-level road information of the initial navigation path returned by the high-definition map module, and a navigation map apparatus determines a navigation path based on the lane-level road information of the initial navigation path.

A candidate traveling path may be first determined from at least one traveling path through which the target vehicle reaches the destination from a departure place and that is provided by the navigation map module. For the candidate traveling path, a time, a distance length, and the like required for each candidate traveling path are determined based on the first location information, and a target traveling path is determined based on a user requirement.

In a possible implementation, if determining, based on the lane-level road information of the initial navigation path, that an impassable road or a congested road exists in the initial navigation path, the navigation map module updates the initial navigation path based on the determined impassable or congested road and the first location information and the destination of the target vehicle, and determines an updated initial navigation path as the navigation path.

Figure 5C:
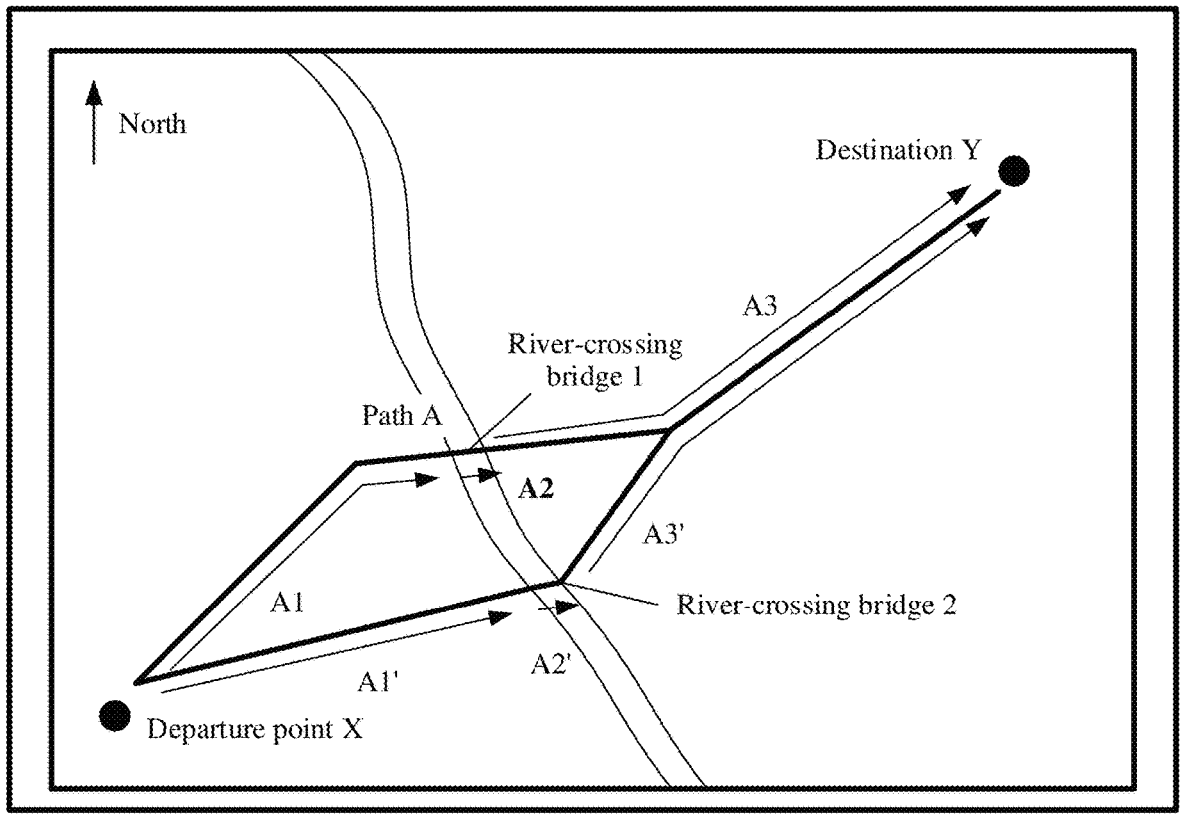

With reference to the foregoing example, if the lane-level road information of the initial navigation path includes: the river-crossing bridge 1 is unavailable and a river-crossing bridge 2 near the river-crossing bridge 1 is available, the river-crossing bridge 2 may be used as an updated subpath of the river-crossing bridge 1. For example, as shown in FIG. 5C, a river-crossing bridge 2 is used as an updated subpath A2 of a subpath A2 corresponding to a river-crossing bridge 1. Further, another subpath in the initial navigation path may also be adaptively adjusted based on the river-crossing bridge 2, a subpath A1 is adaptively modified to a subpath A1' based on a start point of the river-crossing bridge 2, and a subpath A3 is adaptively modified to a subpath A3' based on an end point of the river-crossing bridge 2. After the subpath A1 and the subpath A3 are adaptively modified, it may be further determined, based on the lane-level road information of the initial navigation path, whether the modified subpath A1' and the modified subpath A3' are passable. If the lane-level road information of the initial navigation path does not include lane-level road information corresponding to the modified subpath A1' and the modified subpath A3', a modified initial navigation path (including the modified subpath A1' and the modified subpath A3') may be further returned to the high-definition map module, so that the high-definition map module sends lane-level road information of the modified initial navigation path (including lane-level road information of the modified subpath A1' and lane-level road information of the modified subpath A3') to the navigation map module, and further the navigation map module may determine whether the modified subpath A1' and the modified subpath A3' are roads that are passable or recommended for passing. For a specific process, refer to the foregoing embodiment, and details are not described herein again.

If determining that the modified subpath A1' and the modified subpath A3' are roads that are passable or recommended for passing, the navigation map module may use the modified subpath A1' and the modified subpath A3' as an updated initial navigation path, that is, the navigation path.

In a possible implementation, the initial navigation path includes K paths; and the navigation map module selects the navigation path from the K candidate paths based on the lane-level road information of the initial navigation path. The lane-level road information of the initial navigation path may include at least one of the following: lane information of the initial navigation path in the second preset peripheral region range, lane availability information of the initial navigation path in the second preset peripheral region range, or driving mode information supported by the initial navigation path in the second preset peripheral region range.

For example, the navigation map module may sort congestion degrees of the K paths based on lane-level road information corresponding to the K paths, and further perform screening on the K paths based on the congestion degrees of the K paths. Further, the navigation map module may further determine a maximum vehicle speed, an average vehicle speed, acceleration/deceleration frequency, or the like of subpaths of the K paths based on road types of the subpaths of the K paths, lane curvatures and slopes, and current weather and traffic flow data of the subpaths. Further, screening is performed on the K paths based on the foregoing information. For another example, the navigation map module may further perform matching on the K paths based on a traveling mode selected for the vehicle. For example, currently, most vehicles have three control modes: Sport, Normol, and Eco. Certainly, with development of vehicle technologies, more other possible control modes may also be developed. This is not limited in this application. Acceleration/deceleration/braking levels of the vehicle in the foregoing three control modes are different. For example, in the Sport mode, the vehicle has a highest acceleration/deceleration speed, that is, a time for acceleration/deceleration is relatively short; and the vehicle can accelerate or decelerate relatively quickly, and can adapt to a path in which there are a complex road condition and a relatively large quantity of curves and road type switching occurs frequently. In the Normol mode, the vehicle has an acceleration/deceleration speed lower than that in the Sport mode. In the Eco mode, the vehicle has a relatively low acceleration/deceleration speed. The Eco mode is a mode with a lowest acceleration/deceleration speed among the three modes. In this mode, the vehicle takes a relatively long time to accelerate or decelerate. If there is a case in a navigation path, for example, lane switching occurs frequently, an overpass is entered or exited, or there is a plurality of curves, this is not conducive to improvement of driving experience. Therefore, the navigation map module may correspondingly perform navigation path screening based on different traveling modes.

For another example, traveling modes may alternatively be divided based on different self-driving modes. For example, the traveling modes may include modes such as manual driving, self-driving, and continuous long-distance self-driving. In this case, the navigation map module may perform screening based on a traveling mode suitable for a path. For example, assuming that a path 1 supports self-driving, when the navigation map module determines that the target vehicle selects the self-driving mode, the path 1 may be used as a navigation path. Assuming that only 20% of a distance of the path 1 supports self-driving, when the navigation map module determines that the target vehicle selects the self-driving mode, the path 1 is used as a route that is not recommended to be selected. For another example, if it is determined that a subpath whose continuous distance exceeds a preset threshold exists in the path 1, a subpath 1 may be displayed to a user when the target vehicle travels into a range of the subpath 1, to inform the user that the self-driving mode may be selected in the subpath 1. Different navigation path selection conditions may be correspondingly set for different traveling modes, to adapt to different traveling modes, and further improve performance of navigation path planning In existing technologies, an update source of map data of a navigation map is relatively unitary, all the map data is mainly updated depending on the map in a relatively lagged manner, and therefore it may be impossible to determine in a timely manner whether a road is passable. In contrast, in this embodiment, there are relatively diverse manners for collecting lane information in a high-definition map, and a plurality of ways (for example, a vehicle on a road or a device such as a roadside unit collects ambient environment information) mentioned in the foregoing embodiments may be used. Therefore, an actual passage status of a road may be obtained from the high-definition map in a timely manner, and further the lane-level road information of the initial navigation path is provided by using the high-definition map module, so that a navigation path planned by the navigation map module can be more accurate, and performance of navigation planning can be improved.

Example 3

In a scenario in a traveling process, lane-level road information in a first preset peripheral region range of a current location of a target vehicle may be further sent to a navigation map module based on a change of a positioning result of the target vehicle, so that the navigation map module may update a navigation planning path based on the lane-level road information in the first preset peripheral region range of the current location of the target vehicle. The following steps may be specifically included:

Step 501. A high-definition map module determines update information of first location information of the target vehicle based on a current positioning result of the target vehicle.

The update information of the first location information includes update information of the lane-level road information in the first preset peripheral region range of the current location of the target vehicle.

For example, when a traveling location of the target vehicle is beyond the first preset peripheral region range, the high-definition map module may redetermine first location information of the target vehicle based on the current positioning result of the target vehicle, and send, to the navigation map module, the redetermined first location information as the update information of the first location information.

In a possible implementation, the update information of the first location information may be sent by the navigation map module at a first moment after the navigation map module receives the initial navigation path; and the first moment is determined based on a moving speed of the target vehicle.

For example, when predicting, based on a traveling speed of the vehicle, that the traveling location of the target vehicle is about to be beyond the first preset peripheral region range, the high-definition map module may determine the first location information of the target vehicle based on the current positioning result of the target vehicle, so as to ensure that the navigation map module has sufficient time to update navigation when receiving the update information of the first location information.

In another possible implementation, the update information of the first location information is sent by the high-definition map module to the navigation map module when the high-definition map module determines that there is update information of the first location information corresponding to the current positioning position of the target vehicle.

Figure 6:
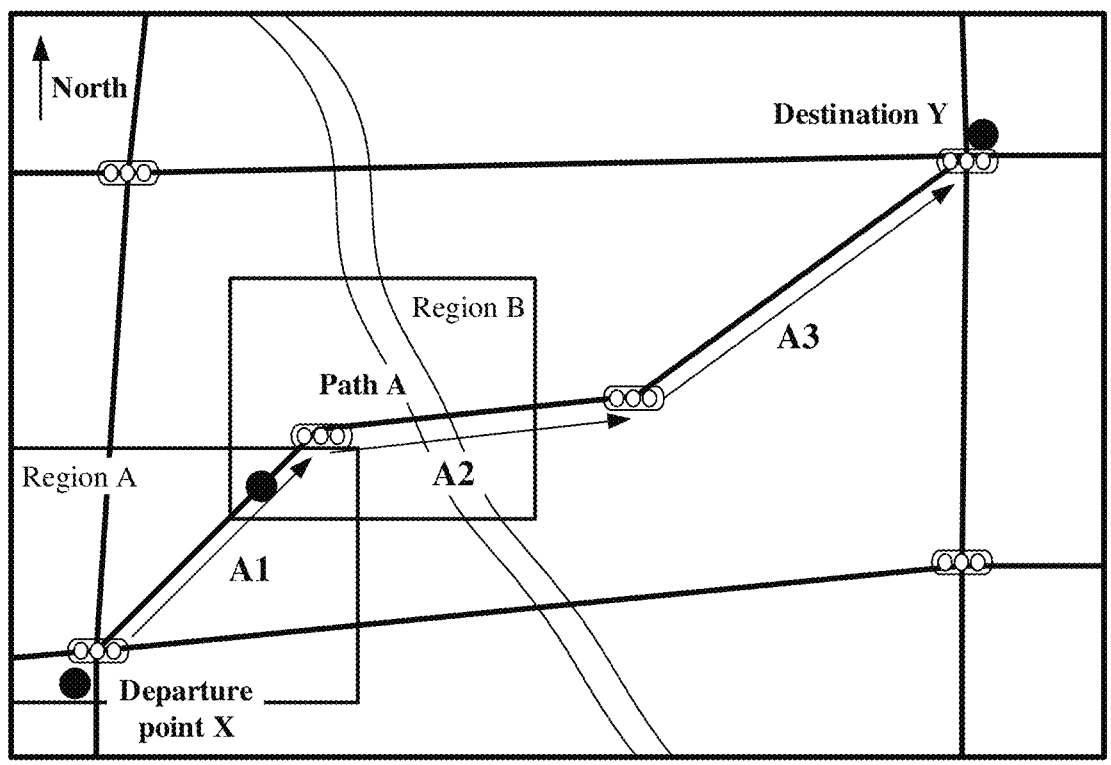
FIG. 6 is a schematic diagram of paths to which a navigation method is applicable according to an embodiment of this application.

For example, as shown in FIG. 6, a positioning result of the target vehicle at a start point is A, and a first preset peripheral region range corresponding to the positioning result A is a region A. When the target vehicle travels to a positioning result B, a navigation path in front of the target vehicle includes a subpath A2, and the positioning result B is not beyond a range of the region A, the high-definition map module determines that lane information of the subpath A2 in front of the current positioning result B of the target vehicle changes. In this case, the high-definition map module may determine, based on the positioning result B of the target vehicle, that a first preset peripheral region range corresponding to the positioning result B is a region B, and may use lane information of the region B as update information of the first location information of the target vehicle. Alternatively, the high-definition map module may send, to the navigation map module, information that the lane information of the subpath A2 changes, as update information of the first location information.

Step 502. The high-definition map module sends the update information of the first location information of the target vehicle to the navigation map module.

Step 503. The navigation map module receives the update information of the first location information of the target vehicle sent by the high-definition map module, and the navigation map module determines an updated navigation path based on the update information of the first location information and a destination.

The navigation map module may update a navigation planning path based on the update information of the first location information. For example, a lane recommended for traveling, a predicted time at which the target vehicle travels to a next subpath, a traveling distance length, and the like are provided for the target vehicle based on a lane in which the target vehicle is located, to improve accuracy of navigation broadcast content and a navigation broadcast effect.

Step 504. The navigation map module displays the updated navigation path to a user.

Example 4

In a traveling process of a vehicle, there may be a scenario in which the vehicle does not travel according to a navigation planning path. For example, the vehicle does not change a lane in a timely manner due to road congestion, or the vehicle does not enter a lane in a specified direction due to a problem such as update of a lane identifier, and consequently the vehicle may yaw or has yawed. However, in the prior art, once a target vehicle enters an incorrect lane, a navigation map module cannot discover that the target vehicle may yaw or has yawed. The navigation map module can determine, only after discovering that the target vehicle travels on another road deviating from a navigation path, that is, the target vehicle has completely deviated from the navigation path by a specific distance, that the target vehicle has yawed, and then replan a route. As a result, the target vehicle cannot correct a deviated route in a timely manner.

Based on the foregoing problem, in this embodiment, the high-definition map module may further determine, based on the positioning result of the target vehicle, the lane in which the target vehicle is located, and then compare the lane with the initial navigation path sent by the navigation map module to the high-definition map module, to estimate whether the target vehicle may yaw or has yawed. Further, the high-definition map module may send information corresponding to the yaw to the navigation map module, so that the navigation map module replans a navigation path based on second location information of the target vehicle and information that the target vehicle may yaw or has yawed. In this way, after receiving the information that the target vehicle may yaw, the target vehicle can update a traveling path in a timely manner, thereby reducing impact of the yaw. In a possible scenario, after the navigation map module determines the navigation path based on current location information and the destination of the target vehicle, the following steps may be performed.

Step 601. The high-definition map module determines yaw probability information of the target vehicle based on the navigation path and second location information of the target vehicle. The yaw probability information is used to indicate a probability that the target vehicle travels from the second location and then deviates from the navigation path. The second location information may include lane information of the second location at which the target vehicle is currently located. Further, the second location information may include lane-level road information in a first preset peripheral region range of the second location at which the target vehicle is currently located.

Figure 7A:
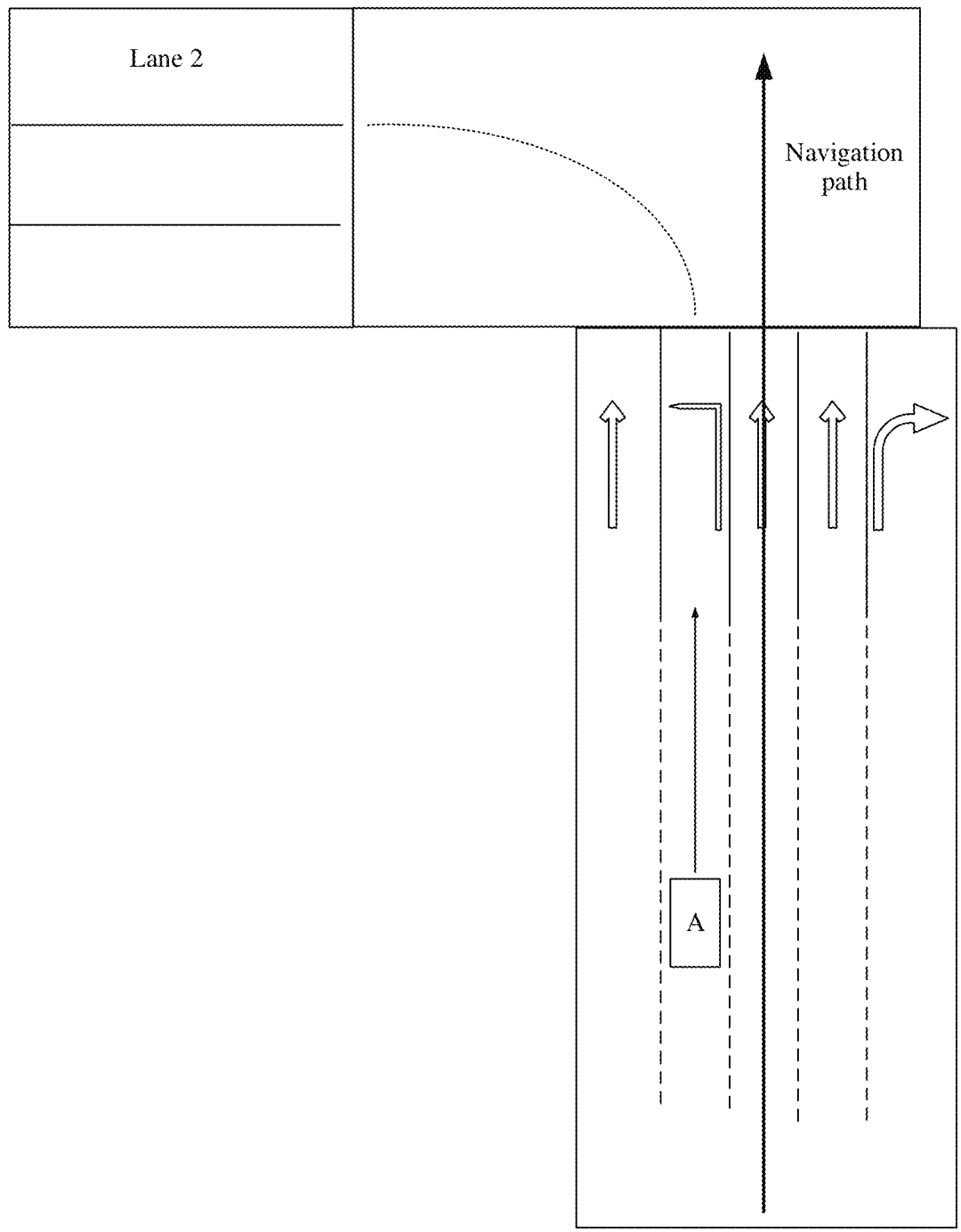
FIG. 7A to FIG. 7C are schematic diagrams of paths to which a navigation method is applicable according to an embodiment of this application.
Figure 7B:
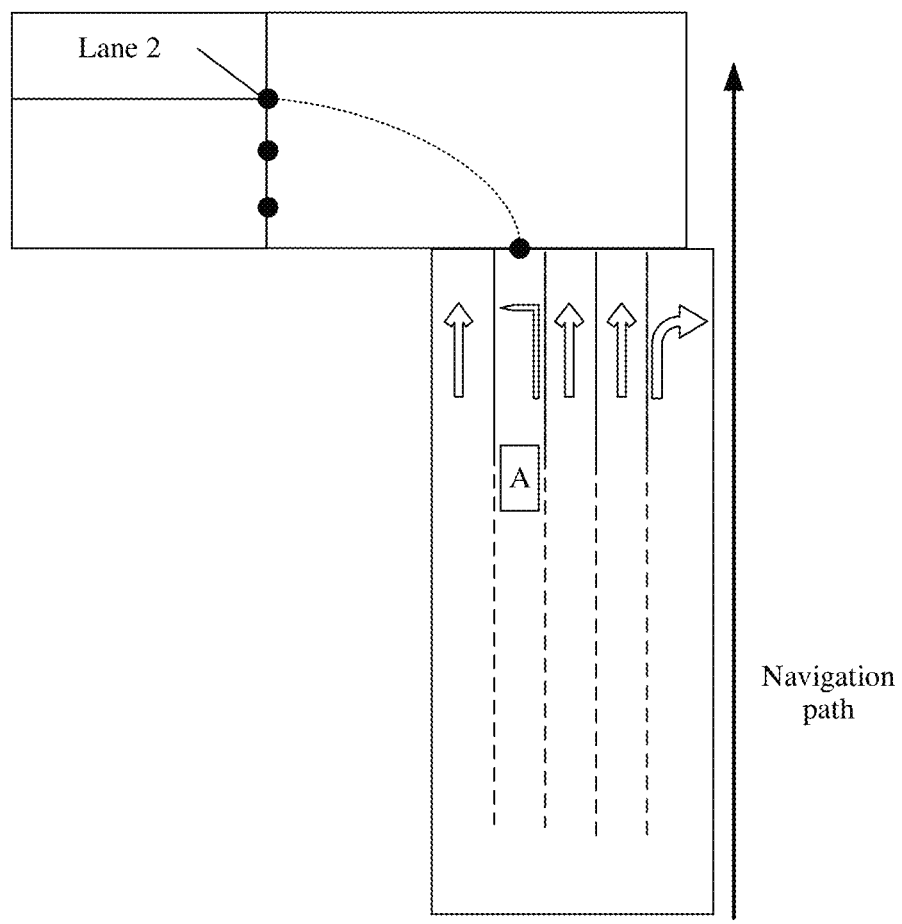

For example, as shown in FIG. 7A, the high-definition map module determines that a lane in which the target vehicle is located is a lane 1 and that a lane direction of the lane 1 is a left-turn direction. The high-definition map module may determine, based on a navigation path, that the target vehicle should travel on a current road in a straight direction. Therefore, the high-definition map module may determine that if the target vehicle continues to travel according to the current lane, when the target vehicle passes through an intersection, there is a relatively high probability that the target vehicle enters a left-turn lane and yaws. In a scenario in which the target vehicle has yawed because the target vehicle enters an incorrect lane, the target vehicle determines that a yaw probability of the target vehicle is related to a factor such as whether a lane change is allowed at a location in which the target vehicle may yaw. Therefore, the yaw probability information may be determined based on the second location at which the target vehicle is currently located. For example, as shown in FIG. 7A, a lane change is allowed at a location of the target vehicle, that is, the target vehicle may switch from a left-turn lane to a straight lane. Therefore, a yaw probability in this case is relatively low. As shown in FIG. 7B, a lane change is not allowed at a location of the target vehicle. Therefore, a yaw probability of the target vehicle in this case is relatively high. Certainly, the yaw probability information may also be related to a congestion degree of a current lane. In other words, the yaw probability information may also be determined based on historical data about yaw occurring on the vehicle when the vehicle passes through a current intersection. This is not limited herein.

Further, the yaw probability information may include third location information, the third location information includes lane information of a third location, the third location is a location that is predicted by the high-definition map module based on the second location information and to which the target vehicle may travel after a specific time period, and the third location is not in the navigation path.

Figure 7C:
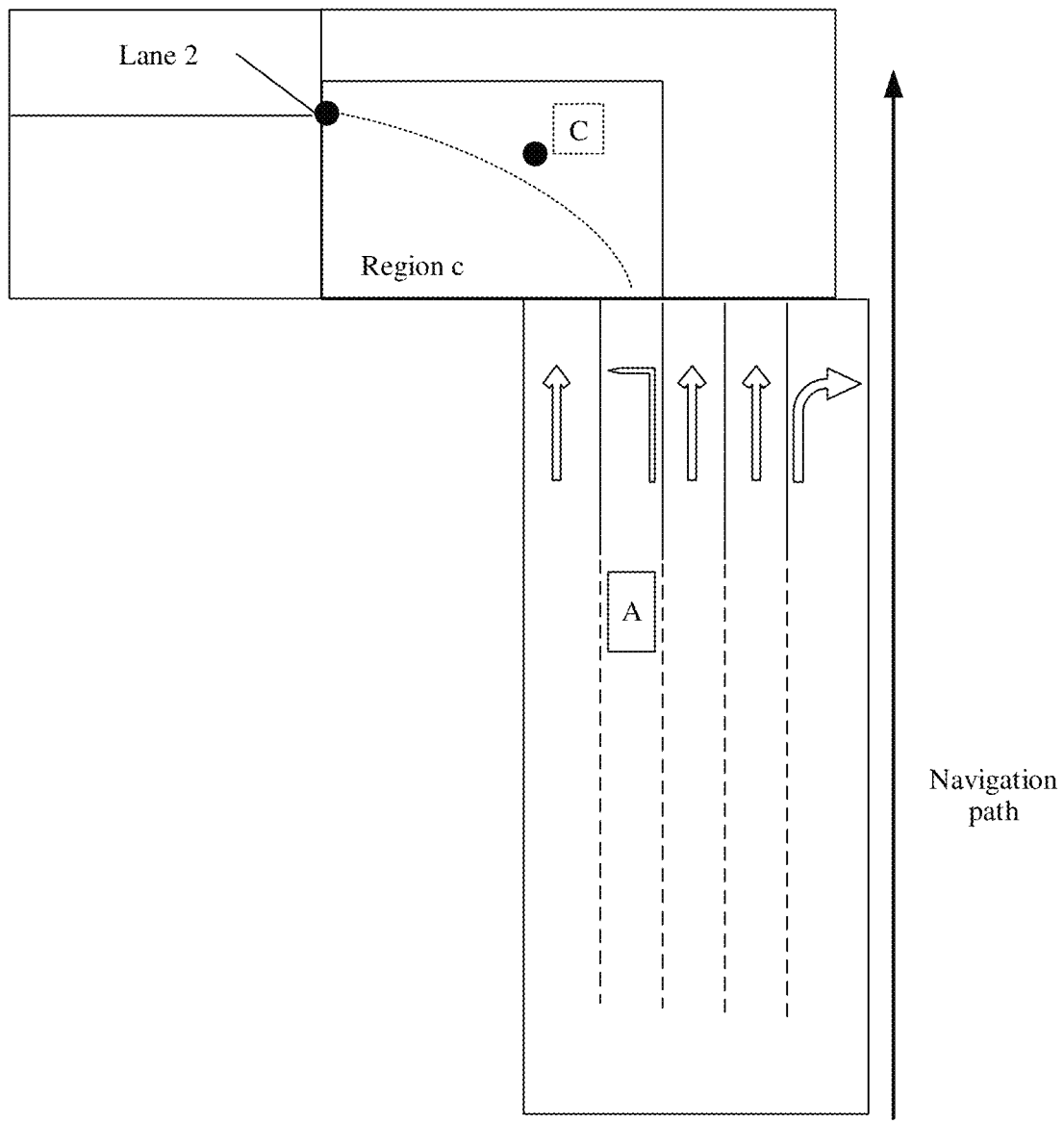

For example, as shown in FIG. 7C, the high-definition map module predicts that when the target vehicle passes through a preset distance range (a road to which the target vehicle is about to travel, for example, an intersection), there is a relatively high probability that the target vehicle reaches a road corresponding to a left-turn direction. In this case, the high-definition map module may predict that the target vehicle reaches, at a next moment, a location C indicated by third location information, where lane information corresponding to the location C is a lane 2. The next moment may be a response time required by the navigation map module to replan a path after the navigation map module obtains yaw probability information, so that the navigation map module updates a navigation path in a timely manner. A probability that the high-definition map module travels to the location C in a preset distance range (region C) may be determined based on a historical record of the target vehicle, may be determined based on a historical record of a traffic rule violation at a current intersection, or may be determined in another manner. This is not limited herein.

Step 602. The high-definition map module sends the yaw probability information to the navigation map module.

Step 603. The navigation map module receives the second location information of the target vehicle and the yaw probability information that are sent by the high-definition map module.

After receiving the navigation probability information, the navigation map module may generate corresponding prompt information based on the yaw probability information. In a possible manner, the prompt information may be used to prompt that the target vehicle may yaw. With reference to the foregoing example, the navigation map module may inform a user that the target vehicle travels in an incorrect lane and is about to yaw, to remind the user in a timely manner to correct the yaw. For example, as shown in FIG. 7A, a lane change is allowed at the location of the target vehicle, that is, the target vehicle may switch from a left-turn lane to a straight lane. In this case, the navigation map module may remind the user to correct possible yaw in a timely manner, thereby improving a navigation effect, and avoiding unnecessary detour of the vehicle caused because the vehicle travels in an incorrect lane, to improve a navigation effect. In another possible manner, the prompt information may be further used to prompt the user whether a navigation path needs to be switched based on a yaw location, or the like. The foregoing example is still used. As shown in FIG. 7B, a lane change is not allowed at the location of the target vehicle. In this case, a user may choose to switch the navigation path based on the yaw location, to avoid a traffic rule violation caused when the user continues to travel according to an original navigation route without noticing that a current lane is a left-turn lane, thereby improving a navigation effect.

Step 604. The navigation map module updates the navigation path based on the second location information, the yaw probability information, and the destination.

Figure 8A:
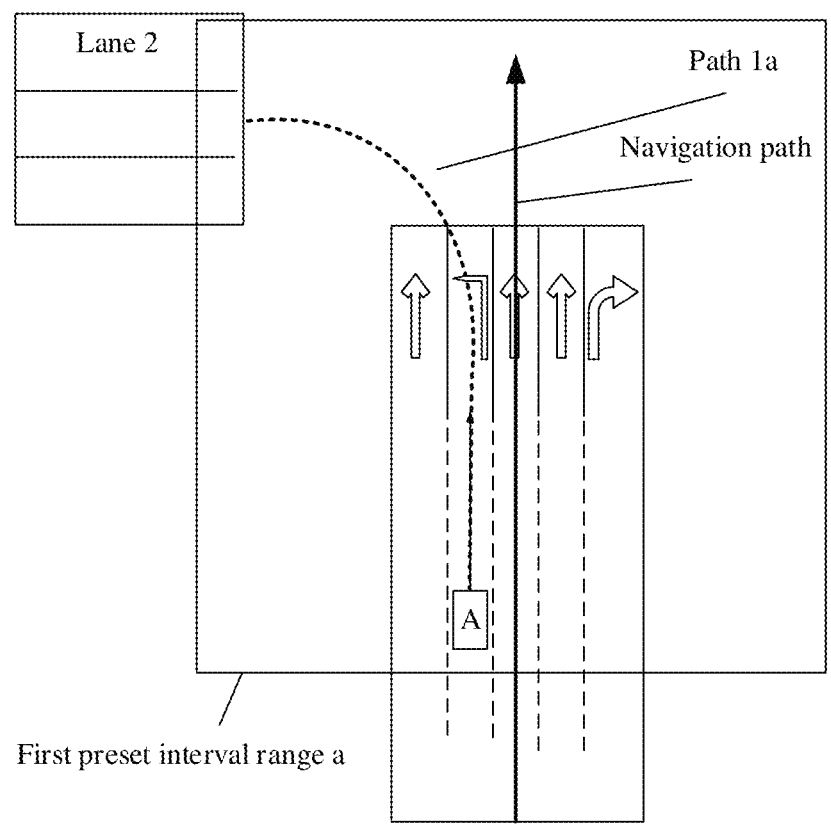
FIG. 8A to FIG. 8C are schematic diagrams of paths to which a navigation method is applicable according to an embodiment of this application.

The navigation map module may replan a navigation path based on lane information of the target vehicle in the second location information, the lane-level road information in the first preset interval range corresponding to the current location of the target vehicle, and the destination. For an example implementation, refer to the navigation path planning method in the foregoing embodiment. Details are not described herein again. For example, as shown in FIG. 8A, a lane in which a current location A of the target vehicle is located is a lane 1. The navigation map module may plan a path 1a based on the current location A, lane-level road information in a first preset interval range a corresponding to the current location A, and a destination Y. The navigation map module may store the planned path in the navigation map module as a candidate path, or may directly display the planned path on a user interface to notify a user whether a navigation path needs to be switched. After receiving an instruction of the user for performing switching between navigation paths, the navigation map module uses the candidate path as an updated navigation path, and displays the updated navigation path to the user.

Figure 8B:
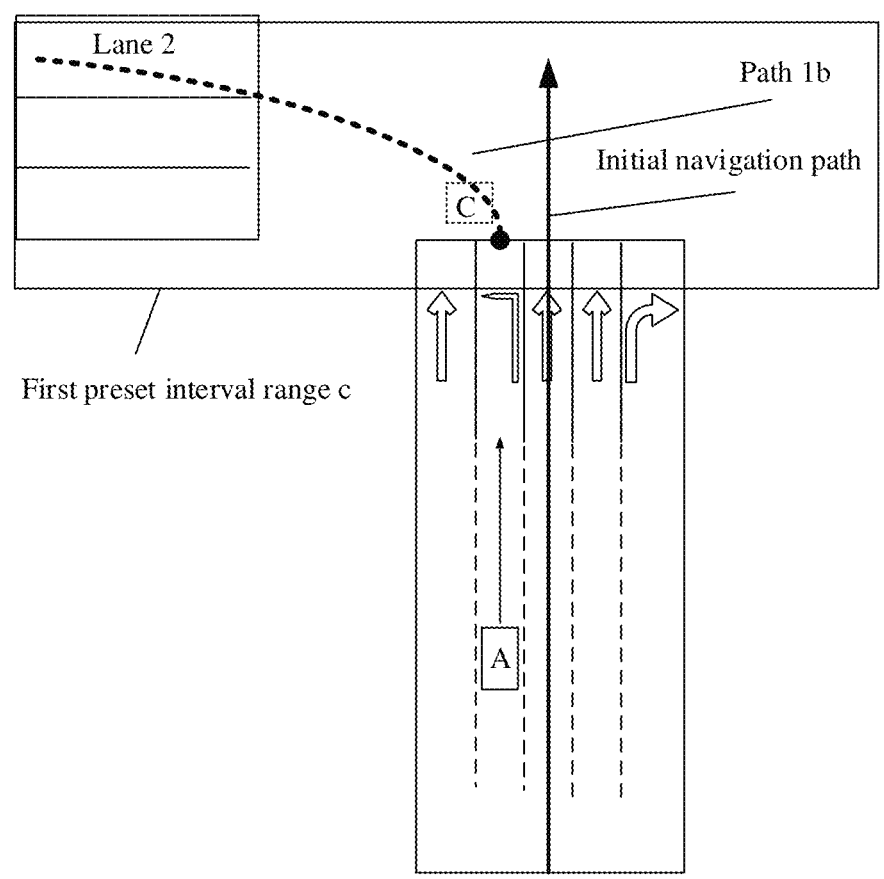

Further, the navigation map module may perform path planning based on a location that the target vehicle is predicted to reach and that is indicated by the third location information, lane-level road information in a first preset interval range corresponding to the predicted location, and the destination, and store a planned path in the navigation map module as a candidate path. For example, as shown in FIG. 8B, a lane in which a current location A of the target vehicle is located is a lane 1, and a lane in which a predicted location C of the target vehicle is located is a lane 2. The navigation map module may plan a path 1b based on the predicted location C, lane-level road information in a first preset interval range c corresponding to the predicted location C, and a destination Y. When receiving an instruction of a user for performing switching between navigation paths, or when determining that the target vehicle is at a location indicated by the third location information, the navigation map module uses the path 1b as an updated navigation path, and displays the updated navigation path to the user.

Figure 8C:
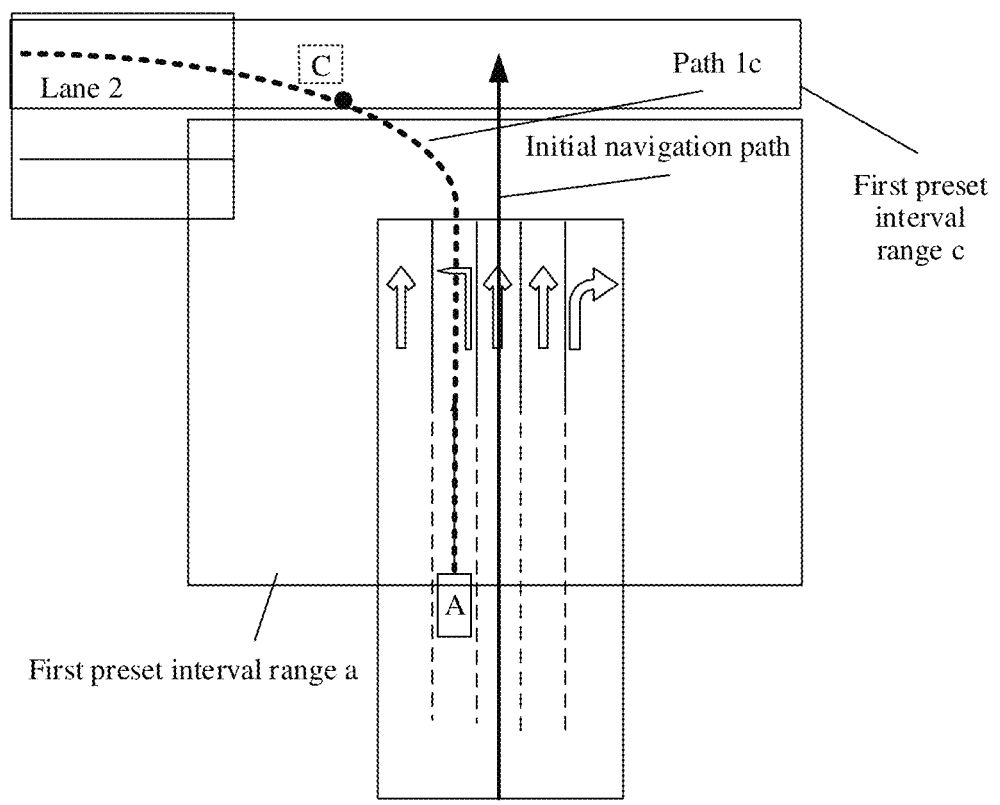

In another possible manner, to improve robustness of navigation path planning, and avoid impact of a relatively large deviation between a predicted location and an actual location of the target vehicle on navigation path planning, in this embodiment, a navigation path may alternatively be planned based on the current location A of the target vehicle in the second location information, the lane-level road information in the first preset interval range a corresponding to the current location A of the target vehicle, the location C that the target vehicle is predicted to reach and that is in the third location information, the lane-level road information in the first preset interval range c corresponding to the predicted location C of the target vehicle, and the destination, and the planned path is stored in the navigation map module as a candidate path. For example, as shown in FIG. 8C, a lane in which a current location A of the target vehicle is located is a lane 1, and a lane in which a predicted location C of the target vehicle is located is a lane 2. The navigation map module planes a path 1c based on the current location A, lane-level road information in a first preset interval range a corresponding to the current location A, the predicted location C, lane-level road information in a first preset interval range c corresponding to the predicted location, and a destination Y. When receiving an instruction of a user for performing switching between navigation paths, or when determining that the target vehicle is at a location indicated by the third location information, the navigation map module uses the path 1c as an updated navigation path, and displays the updated navigation path to the user.

In another possible scenario, after the navigation map module determines the navigation path based on current location information and the destination of the target vehicle, the following steps may be performed.

Step 701. The high-definition map module determines yaw alarm information of the target vehicle based on the navigation path and the second location information of the target vehicle.

The yaw alarm information includes the second location information, and the yaw alarm information is used to indicate that the second location at which the target vehicle is currently located is not in the navigation path.

Step 702. The high-definition map module sends the yaw alarm information to the navigation map module.

Step 703. The navigation map module receives the yaw alarm information, and further updates the navigation path based on the second location information, the yaw alarm information, and the destination.

Step 704. The navigation map module may display an updated navigation path to a user.

Figure 9A:
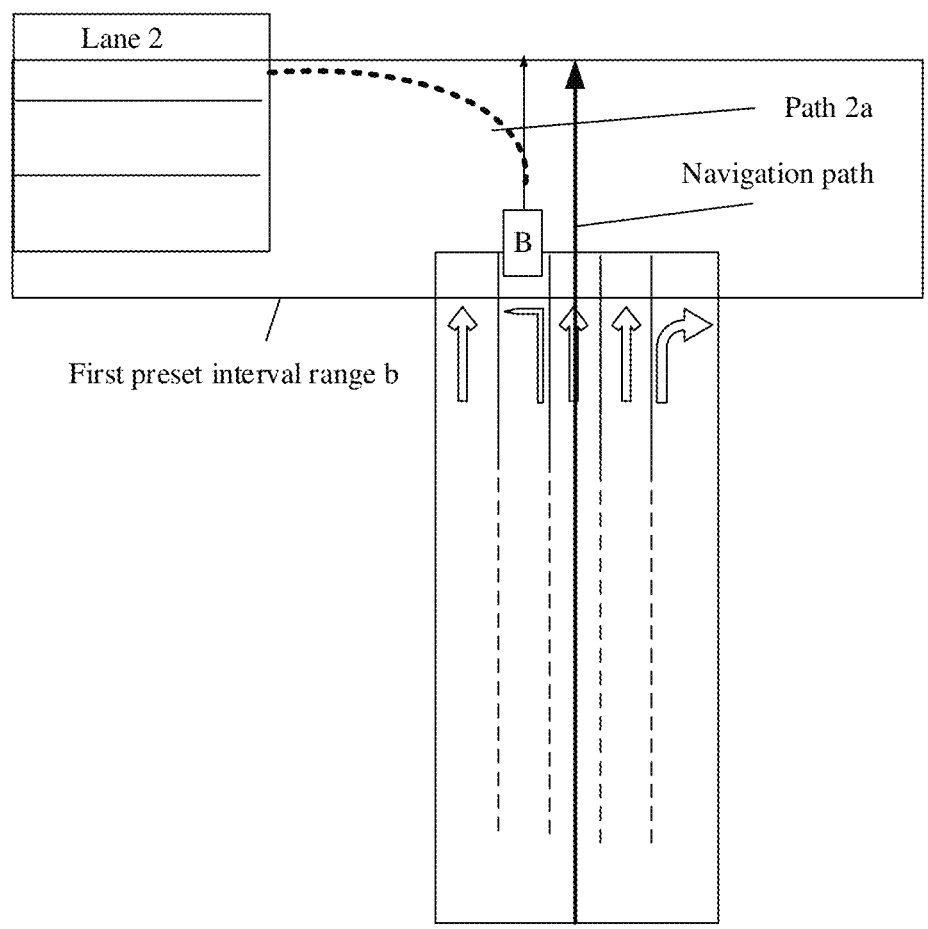
FIG. 9A to FIG. 9C are schematic diagrams of paths to which a navigation method is applicable according to an embodiment of this application.

For example, as shown in FIG. 9A, the second location information may include a current location B of the target vehicle and lane information in a first preset peripheral range b corresponding to the current location B. For example, the second location information includes a lane 1. With reference to the foregoing example, the navigation map module may perform navigation path planning based on the current location B, the lane 1, and a destination, and display a planned path 2a on a user interface as a candidate path. After receiving an instruction of a user for performing switching between navigation paths, the navigation map module uses the candidate path 2a as a navigation path.

Further, the yaw alarm information may include third location information, and the third location information may include lane information of a predicted location B' in which the target vehicle is predicted to travel and that is determined by the high-definition map module based on the second location information, and lane information in a first preset interval range b' of the predicted location B'.

Figure 9B:
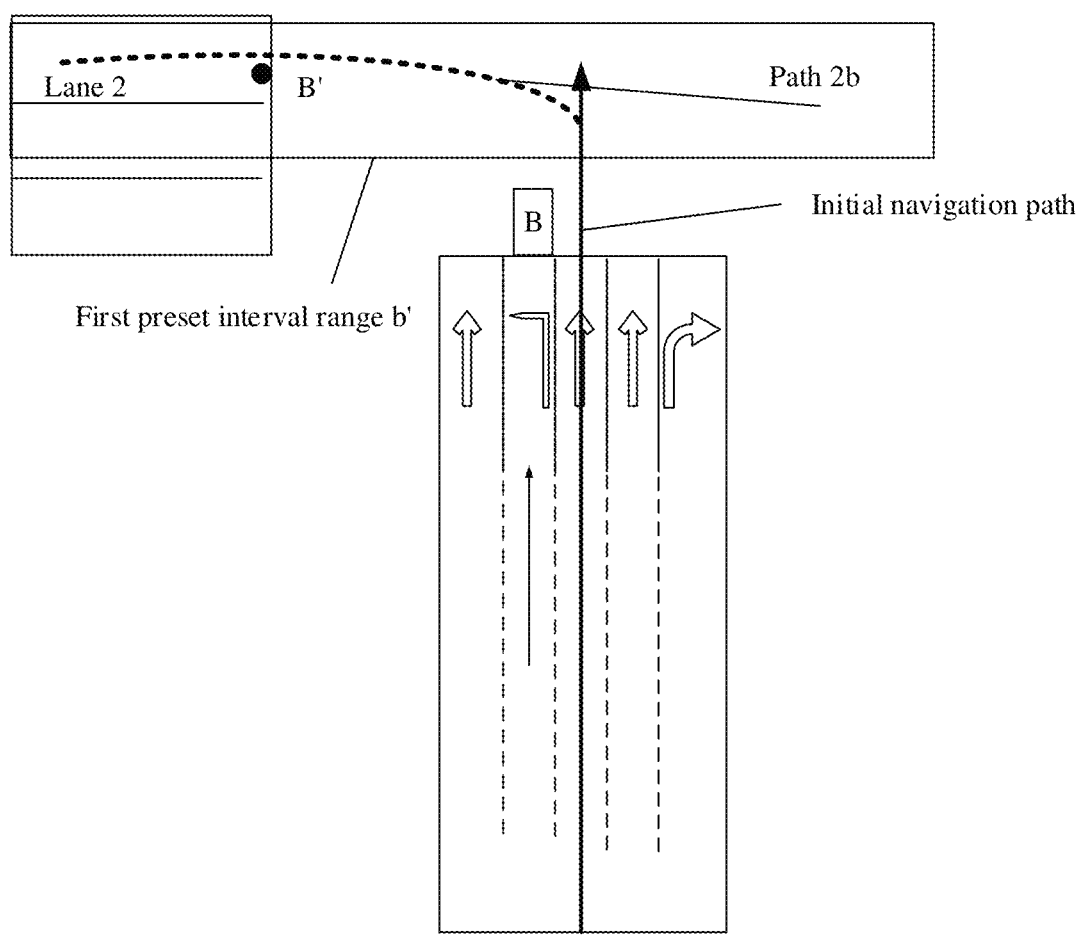

For another example, as shown in FIG. 9B, the third location information may include a predicted location B' of the target vehicle and lane information in a first preset peripheral range b' corresponding to the predicted location B'. For example, the third location information includes a lane 2. With reference to the foregoing example, the navigation map module may perform navigation path planning based on the predicted location B', the lane 2, and a destination, and display a planned path on a user interface as a candidate path. When receiving an instruction of a user for performing switching between navigation paths, or when determining that the target vehicle is at a location indicated by the third location information, the navigation map module uses the candidate path as an updated navigation path, and displays the updated navigation path to a user.

Further, the navigation map module may replan a navigation path based on the foregoing third location information, the second location information, and the destination.

Figure 9C:
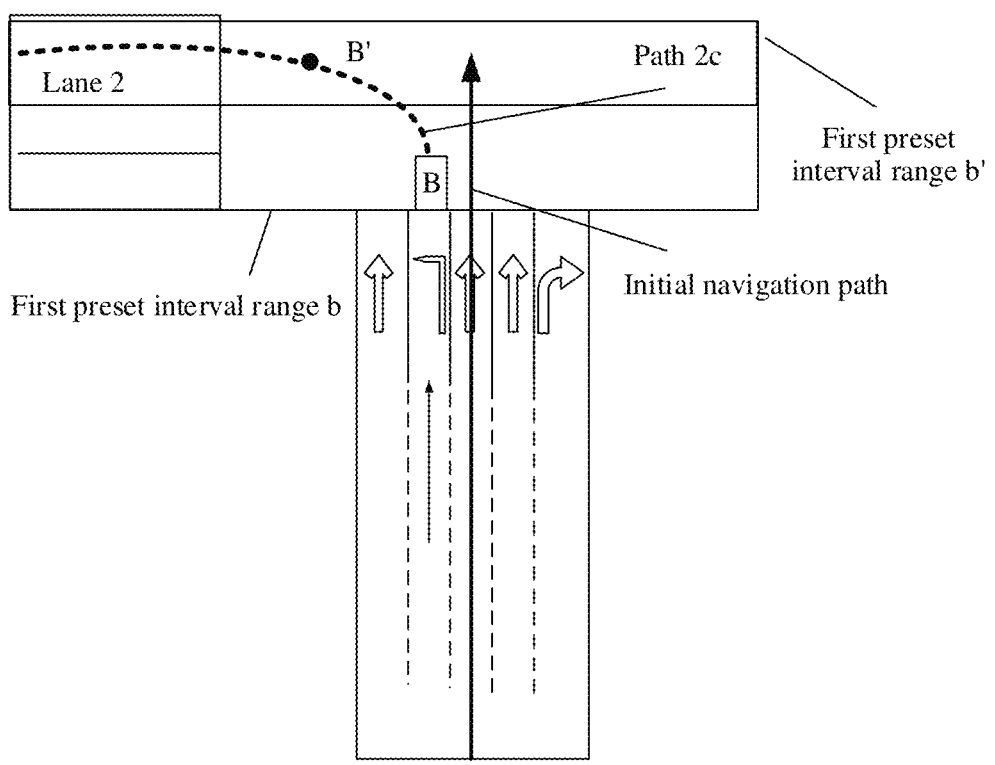

In another alternative solution, as shown in FIG. 9C, the navigation map module may perform navigation path planning based on a current location B of the target vehicle, lane information in a first preset peripheral range b corresponding to the current location B, a predicted location B' of the target vehicle, and lane information in a first preset peripheral range b' corresponding to the predicted location B'. For example, the navigation map module may perform navigation path planning based on a lane 1, the predicted location B', a lane 2, and a destination, and display a planned path on a user interface as a candidate path. When receiving an instruction of a user for performing switching between navigation paths, or when determining that the target vehicle is at a location indicated by the third location information, the navigation map module uses the candidate path as an updated navigation path, and displays the updated navigation path to a user.

Figure 10:
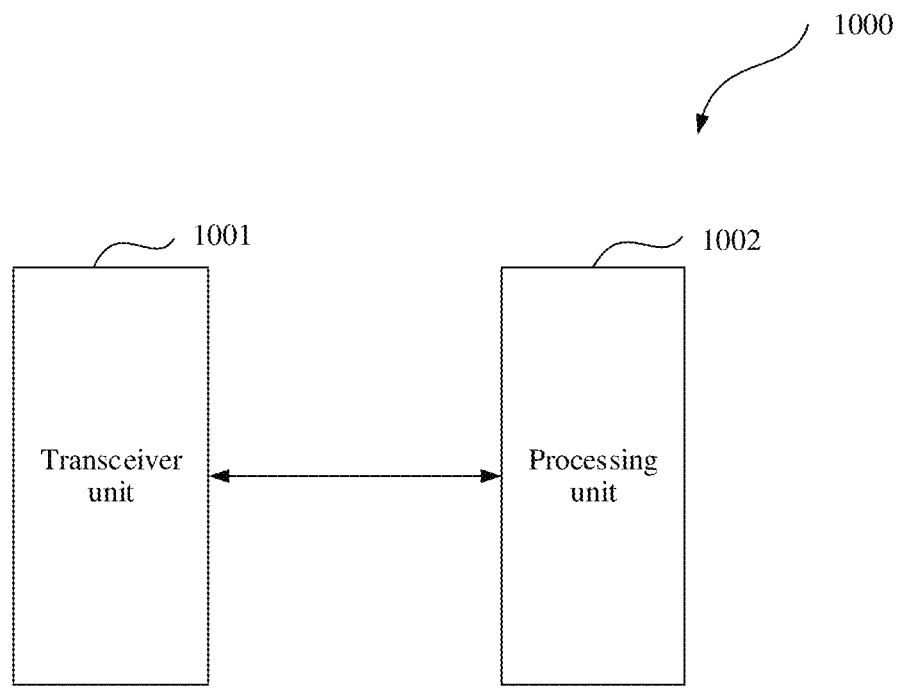
FIG. 10 is a structural block diagram of a navigation apparatus according to an embodiment of this application.

Based on the foregoing method embodiments, an embodiment further provides a navigation apparatus. The navigation apparatus is configured to implement a function of the navigation map module in FIG. 2. Referring to FIG. 10, a navigation apparatus 1000 includes a transceiver unit 1001 and a processing unit 1002. The following describes functions of the units and relationships between the units when the navigation apparatus 1000 plans a vehicle traveling route.

The transceiver unit 1001 is configured to receive first location information of a target vehicle sent by a high-definition map module, where the first location information includes lane information of a first location at which the target vehicle is currently located.

The processing unit 1002 is configured to determine a navigation path based on the first location information of the target vehicle and a destination.

In an example embodiment, the first location information further includes lane-level road information in a first preset peripheral region range of the first location at which the target vehicle is currently located.

In an example embodiment, the processing unit 1002 is configured to: generate an initial navigation path based on the first location information and the destination of the target vehicle; and determine the navigation path based on lane-level road information of the initial navigation path.

The transceiver unit 1001 is configured to send the initial navigation path to the high-definition map module; and receive the lane-level road information of the initial navigation path returned by the high-definition map module, where the lane-level road information of the initial navigation path includes lane-level road information of the initial navigation path.

In an example embodiment, the lane-level road information of the initial navigation path further includes lane-level road information of a road section in a second preset peripheral region range corresponding to the initial navigation path.

In an example embodiment, the processing unit 1002 is further configured to: if it is determined, based on the lane-level road information of the initial navigation path, that a road or lane that is impassable or that is recommended to be bypassed exists in the initial navigation path, determine, based on the determined road or lane that is impassable or that is recommended to be bypassed, and the first location information and the destination of the target vehicle, that the navigation path is an updated initial navigation path.

In an example embodiment, the initial navigation path includes K candidate paths; and the processing unit 1002 is further configured to select the navigation path from the K candidate paths based on the lane-level road information of the initial navigation path, where the lane-level road information of the initial navigation path includes at least one of: lane information of the initial navigation path in the second preset peripheral region range, lane availability information of the initial navigation path in the second preset peripheral region range, or driving mode information supported by the initial navigation path in the second preset peripheral region range.

In an example embodiment, the transceiver unit 1001 is further configured to: receive second location information of the target vehicle sent by the high-definition map module, where the second location information includes lane information of a second location at which the target vehicle is currently located; and receive, for the navigation map module, yaw probability information, where the yaw probability information is used to indicate a probability that the target vehicle travels from the second location and then deviates from the navigation path.

The processing unit 1002 is further configured to: determine, based on the yaw probability information, to update the navigation path; and update the navigation path based on the second location information and the destination.

In an example embodiment, the second location information further includes lane-level road information in a first preset peripheral region range of the second location at which the target vehicle is currently located.

In an example embodiment, the transceiver unit 1001 is further configured to: receive second location information of the target vehicle sent by the high-definition map module, where the second location information includes lane information of a second location at which the target vehicle is currently located; receive yaw alarm information, where the yaw alarm information is used to indicate that the second location is not in the navigation path.

The processing unit 1002 is further configured to update the navigation path based on the second location information and the destination.

In an example embodiment, the transceiver unit 1001 is further configured to receive third location information sent by the high-definition map module, where the third location information includes lane information of a third location, the third location is a location that is predicted by the high-definition map module based on the second location information and to which the target vehicle may travel after a specific time period, and the third location is not in the navigation path.

The processing unit 1002 is further configured to update the navigation path based on the second location information, the third location information, and the destination.

Based on the foregoing method embodiments, an embodiment further provides a navigation apparatus. The navigation apparatus is configured to implement a function of the high-definition map module in FIG. 2. Referring to FIG. 10, a navigation apparatus 1000 includes a transceiver unit 1001 and a processing unit 1002. The following describes functions of the units and relationships between the units when the navigation apparatus 1000 plans a vehicle traveling route.

The processing unit 1002 is configured to generate first location information of a target vehicle based on positioning information of the target vehicle, where the first location information includes lane information of a first location at which the target vehicle is currently located.

The transceiver unit 1001 is configured to send the first location information of the target vehicle to a navigation map module, where the first location information is used by the navigation map module to determine a navigation path.

In an example embodiment, the first location information further includes lane-level road information in a first preset peripheral region range of the first location at which the target vehicle is currently located.

In an example embodiment, the transceiver unit 1001 is further configured to: receive an initial navigation path from the navigation map module, where the initial navigation path is generated by the navigation map module based on the first location information and a destination; and send the lane-level road information of the initial navigation path to the navigation map module.

The processing unit 1002 is further configured to determine the lane-level road information of the initial navigation path based on the initial navigation path, where the lane-level road information of the initial navigation path includes lane-level road information of a road section of the initial navigation path.

In an example embodiment, the lane-level road information of the initial navigation path includes at least one of: a road or lane that is impassable or that is recommended to be bypassed in the initial navigation path, lane information of the initial navigation path in a second preset peripheral region range, lane availability information of the initial navigation path in the second preset peripheral region range, or driving mode information supported by the initial navigation path in the second preset peripheral region range.

In an example embodiment, the processing unit 1002 is further configured to: determine second location information of the target vehicle, where the second location information includes lane information of a second location at which the target vehicle is currently located; and determine yaw probability information of the target vehicle based on the navigation path and the second location information, where the yaw probability information is used to indicate a probability that the target vehicle travels from the second location and then deviates from the navigation path.

The transceiver unit 1001 is further configured to: send the second location information to the target vehicle; and send the yaw probability information to the navigation map module.

In an example embodiment, the processing unit 1002 is further configured to: determine second location information of the target vehicle, where the second location information includes lane information of a second location at which the target vehicle is currently located; and generate yaw alarm information of the target vehicle based on the navigation path and the second location information, where the yaw alarm information is used to indicate that the second location is not in the navigation path.

The transceiver unit 1001 is further configured to: send the second location information to the target vehicle; and send the yaw alarm information to the navigation map module.

In an example embodiment, the processing unit 1002 is further configured to: generate third location information based on the navigation path and the second location information, where the third location information includes lane information of a third location, the third location is a location that is predicted by the high-definition map module based on the second location information and to which the target vehicle may travel after a specific time period, and the third location is not in the navigation path.

The transceiver unit 1001 is further configured to send the third location information to the navigation map module.

In an example embodiment, the first location information and the second location information include one or more of: a vehicle head direction of the target vehicle, lane information in a first preset peripheral region range of a current location of the target vehicle, or lane availability information in the first preset peripheral region range of the current location of the target vehicle; and the third location information includes one or more of: a predicted vehicle head direction of the target vehicle, lane information in a first preset peripheral region range of a predicted location of the target vehicle, or lane availability information in the first preset peripheral region range of the predicted location of the target vehicle.

In an example embodiment, the lane information includes one or more of: a quantity of lanes, a number of a lane, lane direction information, lane start and end points, a lane change point, lane curvature information, lane slope information, or a lane type; the lane type may include a main road lane, a side road lane, a merging lane, a ramp lane, a unidirectional lane, a bidirectional lane, or a tidal lane; and the lane availability information includes at least one of: information indicating whether a lane is passable, information indicating that a lane is recommended to be bypassed, road condition information, or traffic rule information.

It should be noted that unit division in the foregoing embodiments of this application is an example, is merely logical function division, and may be other division in actual implementation. In addition, functional units in the embodiments of this application may be integrated into one processing unit, or may exist alone physically. Alternatively, two or more units may be integrated into one unit. One or more of the foregoing units may be implemented by using software, hardware, firmware, or a combination thereof. The software or firmware includes but is not limited to a computer program instruction or code, and may be executed by a hardware processor. The hardware includes but is not limited to various types of integrated circuits, for example, a central processing unit (CPU), a digital signal processor (DSP), a field-programmable gate array (FPGA), or an application-specific integrated circuit (ASIC).

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 11:
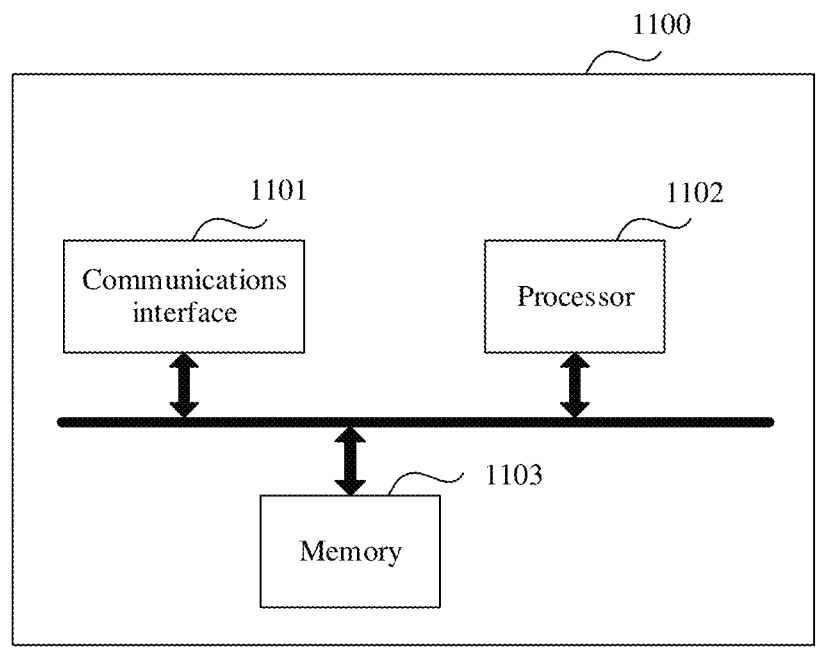
FIG. 11 is a structural block diagram of a navigation apparatus according to an embodiment of this application.

Based on the foregoing embodiments, an embodiment of this application further provides a navigation apparatus. The device can complete the operations of the navigation map module in FIG. 2 or complete the operations of the high-definition map module in FIG. 2, or the navigation apparatus can complete the operations of the navigation map module and the high-definition map module. Referring to FIG. 11, a device 1100 includes a communications interface 1101, a processor 1102, and a memory 1103.

The communications interface 1101, the memory 1103, and the processor 1102 are connected to each other. Optionally, the communications interface 1101, the memory 1103, and the processor 1102 may be connected to each other by using a bus. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

The communications interface 1101 is configured to implement communication between the navigation apparatus and another component in a navigation system. For example, if the navigation apparatus includes a navigation map module, the communications interface 1101 may be configured to receive first location information of a target vehicle sent by a high-definition map module, where the first location information includes lane information of a first location at which the target vehicle is currently located. If the navigation apparatus includes a high-definition map module, the communications interface 1101 may be configured to: receive a positioning result of a target vehicle sent by a positioning system; and send first location information of the target vehicle to a navigation map module, where the first location information is used by the navigation map module to determine a navigation path.

Figure 3:
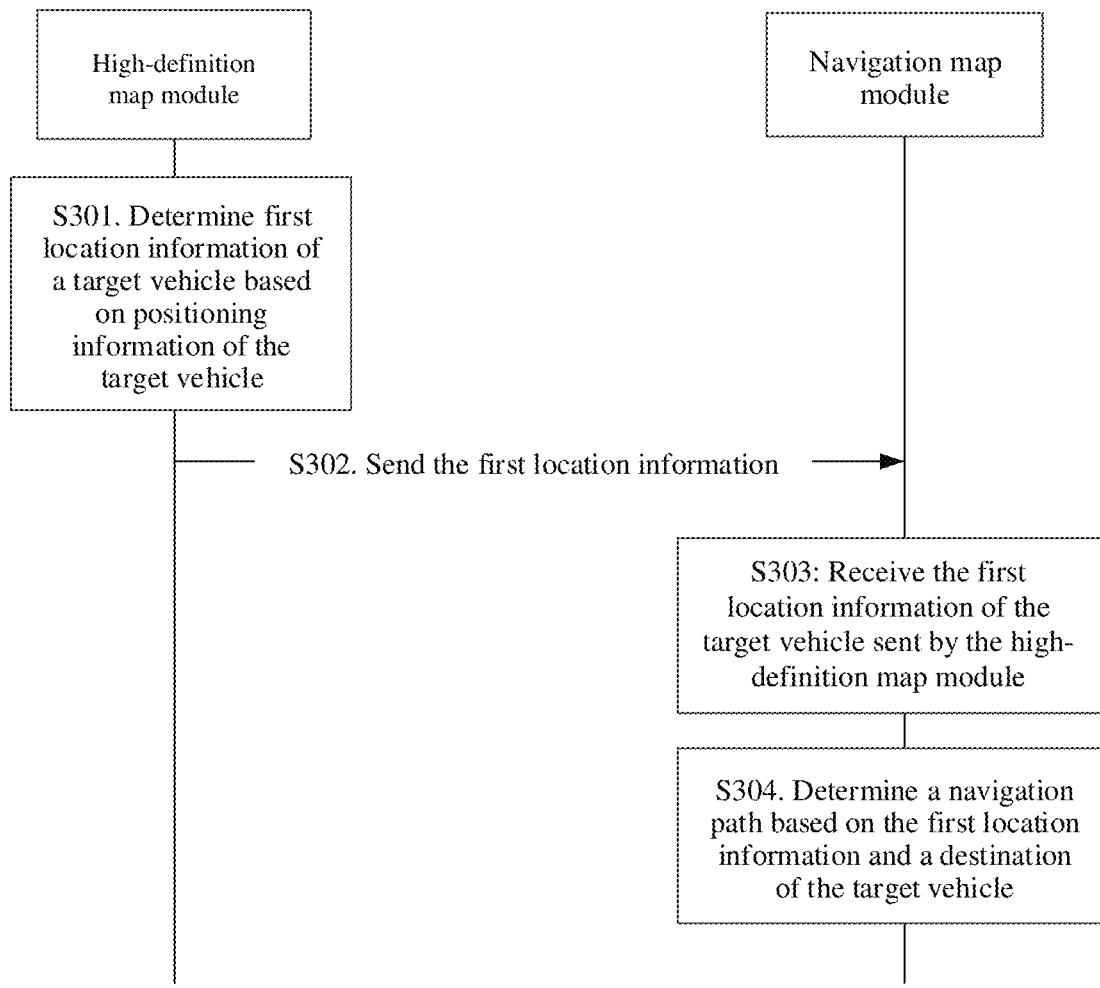
FIG. 3 is a flowchart of a navigation method according to an embodiment of this application.

The processor 1102 is configured to implement the navigation solution shown in FIG. 3. For details, refer to the description in the embodiment shown in FIG. 3. Details are not described herein again. Optionally, the processor 1102 may be a central processing unit (CPU) or another hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. When implementing the foregoing functions, the processor 1102 may be implemented by using hardware, or certainly may be implemented by hardware executing corresponding software.

The memory 1103 is configured to store a program instruction, data, and the like. Specifically, the program instruction may include program code, and the program code includes one or more instructions for a computer operation. The memory 1103 may include a random access memory (RAM), or may be a non-volatile memory, for example, at least one magnetic disk memory. The processor 1102 executes a program stored in the memory 1103, and implements the foregoing functions by using the foregoing components, thereby finally implementing the methods provided in the foregoing embodiments.

Based on the foregoing embodiments, an embodiment of this application further provides a navigation system. The navigation system may include the navigation apparatus configured to implement a function of a high-definition map module and the navigation apparatus configured to implement a function of a navigation map module. The navigation apparatus configured to implement a function of a high-definition map module and the navigation apparatus configured to implement a function of a navigation map module may be a general-purpose device or a dedicated device. This is not specifically limited in embodiments of this application. Related functions of the high-definition map module and the navigation map module may be implemented by one device, or may be implemented by a plurality of devices together, or may be implemented by one or more functional modules in one device. This is not specifically limited in embodiments of this application. It can be understood that the foregoing functions may be an element in a hardware device, or may be a software function running on dedicated hardware, a combination of hardware and software, or a virtualization function for instantiation on a platform (for example, a cloud platform).

Based on the foregoing embodiments, an embodiment of this application further provides a computer program product. When the computer program product is run on a processor, the navigation apparatus is enabled to implement the possible methods provided in the foregoing embodiments.

Based on the foregoing embodiments, an embodiment of this application further provides a computer storage medium. The computer storage medium stores a computer program. When the computer program is executed by a processor, the navigation apparatus is enabled to implement the possible methods provided in the foregoing embodiments.

Based on the foregoing embodiments, an embodiment of this application further provides a chip. The chip is configured to read a computer program stored in a memory, to implement the methods provided in the foregoing embodiments.

Based on the foregoing embodiments, an embodiment of this application provides a chip system. The chip system includes a processor, configured to support a computer apparatus in implementing functions related to a terminal device in the methods provided in the foregoing embodiments. In an example embodiment, the chip system further includes a memory, and the memory is configured to store a program and data that are necessary for the computer apparatus. The chip system may include a chip, or may include a chip and another discrete device.

It can be clearly understood by a person skilled in the art that cross-reference may be made to descriptions of the embodiments provided in this application. For example, for convenience and brevity of description, for functions of the apparatuses and devices provided in the embodiments of this application and steps performed by the apparatuses and devices, refer to related descriptions of the method embodiments of this application. Cross-reference may also be made between the method embodiments and the apparatus embodiments.

A person skilled in the art may understand that all or some of the steps of the method embodiments may be implemented by a program instructing related hardware. The program may be stored in a computer-readable storage medium. When the program is executed, all or a part of the steps of the method embodiments are performed. The foregoing storage medium includes any medium that can store program code, such as a ROM, a RAM, a magnetic disk, or an optical disc.

All or some of the foregoing embodiments may be implemented by using software, hardware, firmware, or any combination thereof. When the software is used to implement the embodiments, the embodiments may be all or partially implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk, (SSD)), or the like.

In the several embodiments provided in this application, it should be understood that the disclosed apparatus and method may be implemented in other manners without departing from the scope of this application. For example, the described embodiment is merely an example. For example, the module or unit division is merely logical function division and may be other division during actual implementation. For example, a plurality of units or components may be combined or integrated into another system, or some features may be ignored or not performed. The units described as separate parts may or may not be physically separate, and parts displayed as units may or may not be physical units, in other words, may be located in one position, or may be distributed on a plurality of network units. Some or all the modules may be selected according to actual requirements to achieve the objectives of the solutions of the embodiments. A person of ordinary skill in the art may understand and implement the embodiments of the present invention without creative efforts.

In addition, the described apparatuses, methods, and schematic diagrams in different embodiments may be combined or integrated with another system, module, technology, or method without departing from the scope of this application. In addition, the displayed or discussed mutual couplings or direct couplings or communication connections may be implemented through some interfaces. The indirect couplings or communication connections between the apparatuses or units may be implemented in electrical, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A navigation apparatus for providing a navigation path for a target vehicle, comprising at least one processor and at least one memory, wherein the at least one memory is configured to store program instructions that, when executed by the at least one processor, cause the navigation apparatus to:
 receive first location information of the target vehicle sent by a high-definition map server, wherein the first location information comprises lane information of a first location at which the target vehicle is currently located, wherein the first location information further comprises lane-level road information in a first preset peripheral region range of the first location at which the target vehicle is currently located, the first preset peripheral region range being based on a speed of the target vehicle, and wherein the first location information further comprises lane availability information in the first preset peripheral region range of the first location of the target vehicle, the lane availability information including availability information indicating whether each lane of lanes of a road in the first preset peripheral region range is available, the availability information of each lane including a corresponding congestion status for each lane of the lanes of the road; and
 determine the navigation path based on the first location information and a destination,
 wherein the determination of the navigation path based on the first location information and the destination comprises:
 generating an initial navigation path based on the first location information and the destination;
 sending the initial navigation path to the high-definition map server;
 receiving lane-level road information of the initial navigation path returned by the high-definition map server based on the initial navigation path, wherein the lane-level road information of the initial navigation path comprises lane-level road information of a road section of the initial navigation path; and
 determining the navigation path based on the lane-level road information of the initial navigation path.

2. The navigation apparatus according to claim 1, wherein the lane-level road information of the initial navigation path further comprises lane-level road information of a road section in a second preset peripheral region range corresponding to the initial navigation path.

3. The navigation apparatus according to claim 2, wherein the initial navigation path comprises K candidate paths, and the program instructions, when executed by the at least one processor, further cause the navigation apparatus to:
 select the navigation path from the K candidate paths based on the lane-level road information of the initial navigation path, wherein
 the lane-level road information of the initial navigation path comprises at least one of: lane information of the initial navigation path in the second preset peripheral region range, lane availability information of the initial navigation path in the second preset peripheral region range, or driving mode information supported by the initial navigation path in the second preset peripheral region range.

4. The navigation apparatus according to claim 1, wherein the program instructions, when executed by the at least one processor, further cause the navigation apparatus to:
 determine, based on the lane-level road information of the initial navigation path, that a road or lane that is impassable or that is recommended to be bypassed exists in the initial navigation path; and
 update the initial navigation path to generate the navigation path based on the determined road or lane that is impassable or that is recommended to be bypassed, the first location information, and the destination.

5. The navigation apparatus according to claim 1, wherein the program instructions, when executed by the at least one processor, further cause the navigation apparatus to:
 receive second location information of the target vehicle sent by the high-definition map server, wherein the second location information comprises lane information of a second location at which the target vehicle is currently located;
 receive yaw probability information, wherein the yaw probability information indicates a probability that the target vehicle travels from the second location and then deviates from the navigation path; and update the navigation path based on the yaw probability information, the second location information and the destination.

6. The navigation apparatus according to claim 5, wherein the second location information further comprises lane-level road information in a first preset peripheral region range of the second location at which the target vehicle is currently located.

7. The navigation apparatus according to claim 6, wherein the first location information and the second location information comprise one or more of:
   a vehicle head direction of the target vehicle or lane information in the first preset peripheral region range of a current location of the target vehicle; and
   the program instructions, when executed by the at least one processor, further cause the navigation apparatus to receive third location information sent by the high-definition map server, the third location information comprising one or more of:
   a predicted vehicle head direction of the target vehicle, lane information in a first preset peripheral region range of a predicted location of the target vehicle, or lane availability information in the first preset peripheral region range of the predicted location of the target vehicle.

8. The navigation apparatus according to claim 5, wherein the program instructions, when executed by the at least one processor, further cause the navigation apparatus to:
   receive third location information sent by the high-definition map server, wherein the third location information comprises lane information of a third location, the third location is a location that is predicted by the high-definition map server based on the second location information and to which the target vehicle may travel after a specific time period, and the third location is not in the navigation path; and
   update the navigation path based on the second location information, the third location information, and the destination.

9. The navigation apparatus according to claim 5, wherein the yaw probability information is based on whether a lane change is allowed at the second location, congestion degree of a current lane of the second location, historical data about yaw occurring on the target vehicle when the target vehicle passes through a current intersection, and whether the current lane is a left-turn lane, a right-turn lane, or a straight lane.

10. The navigation apparatus according to claim 1, wherein the program instructions, when executed by the at least one processor, further cause the navigation apparatus to:
   receive second location information of the target vehicle sent by the high-definition map server, wherein the second location information comprises lane information of a second location at which the target vehicle is currently located;
   receive yaw alarm information, wherein the yaw alarm information indicates that the second location is not in the navigation path; and
   update the navigation path based on the second location information and the destination.

11. The navigation apparatus according to claim 1, wherein the lane information comprises one or more of:
   a quantity of lanes, a number of a lane, lane direction information, lane start and end points, a lane change point, lane curvature information, lane slope information, or a lane type; and the lane type comprises a main road lane, a side road lane, a merging lane, a ramp lane, a unidirectional lane, a bidirectional lane, or a tidal lane; and
   the lane information comprises at least one of: information indicating whether a lane is passable, information indicating that a lane is recommended to be bypassed, road condition information, or traffic rule information.

12. A navigation apparatus for providing a navigation path for a target vehicle, comprising at least one processor and at least one memory, wherein the at least one memory is configured to store program instructions that, when executed by the at least one processor, cause the navigation apparatus to:
   generate first location information of the target vehicle based on positioning information of the target vehicle, wherein the first location information comprises lane information of a first location at which the target vehicle is currently located, wherein the first location information further comprises lane-level road information in a first preset peripheral region range of the first location at which the target vehicle is currently located, the first preset peripheral region range being based on a speed of the target vehicle, and wherein the first location information further comprises lane availability information in the first preset peripheral region range of the first location of the target vehicle, the lane availability information including availability information indicating whether each lane of lanes of a road in the first preset peripheral region range is available, the availability information of each lane including a corresponding congestion status for each lane of the lanes of the road; and
   send the first location information to a navigation map device, so that the navigation map device uses the first location information to determine the navigation path,
   wherein the program instructions, when executed by the at least one processor, further cause the navigation apparatus to:
   receive an initial navigation path from the navigation map device, wherein the initial navigation path is generated by the navigation map device based on the first location information and a destination;
   determine lane-level road information of the initial navigation path based on the initial navigation path, wherein the lane-level road information of the initial navigation path comprises lane-level road information of a road section of the initial navigation path; and
   send the lane-level road information of the initial navigation path to the navigation map device, wherein the navigation path is determined using the lane-level road information of the initial navigation path.

13. The navigation apparatus according to claim 12, wherein the lane-level road information of the initial navigation path comprises at least one of: a road or lane that is impassable or that is recommended to be bypassed in the initial navigation path, lane information of the initial navigation path in a second preset peripheral region range, lane availability information of the initial navigation path in the second preset peripheral region range, or driving mode information supported by the initial navigation path in the second preset peripheral region range.

14. The navigation apparatus according to claim 12, wherein the program instructions, when executed by the at least one processor, further cause the navigation apparatus to:
   determine second location information of the target vehicle, wherein the second location information comprises lane information of a second location at which the target vehicle is currently located;

send the second location information to the target vehicle;

determine yaw probability information of the target vehicle based on the navigation path and the second location information, wherein the yaw probability information indicates a probability that the target vehicle travels from the second location and then deviates from the navigation path; and send the yaw probability information to the navigation map device.

15. The navigation apparatus according to claim 14, wherein the first location information and the second location information comprise one or more of:

a vehicle head direction of the target vehicle or lane information in the first preset peripheral region range of a current location of the target vehicle; and the program instructions, when executed by the at least one processor, further cause the navigation apparatus to send third location information, the third location information comprising one or more of:

a predicted vehicle head direction of the target vehicle, lane information in a first preset peripheral region range of a predicted location of the target vehicle, or lane availability information in the first preset peripheral region range of the predicted location of the target vehicle.

16. The navigation apparatus according to claim 12, wherein the program instructions, when executed by the at least one processor, further cause the navigation apparatus to:

determine second location information of the target vehicle, wherein the second location information comprises lane information of a second location at which the target vehicle is currently located;

send the second location information to the target vehicle;

generate yaw alarm information of the target vehicle based on the navigation path and the second location information, wherein the yaw alarm information indicates that the second location is not in the navigation path; and send the yaw alarm information to the navigation map device.

17. The navigation apparatus according to claim 12, wherein the lane information comprises one or more of:

a quantity of lanes, a number of a lane, lane direction information, lane start and end points, a lane change point, lane curvature information, lane slope information, or a lane type; and the lane type comprises a main road lane, a side road lane, a merging lane, a ramp lane, a unidirectional lane, a bidirectional lane, or a tidal lane; and the lane information comprises at least one of: information indicating whether a lane is passable, information indicating that a lane is recommended to be bypassed, road condition information, or traffic rule information.

* * * * *